(12) United States Patent
Sagawa et al.

(10) Patent No.: US 6,299,239 B1
(45) Date of Patent: Oct. 9, 2001

(54) VEHICLE BODY STRUCTURE

(75) Inventors: Kouichi Sagawa, Ebina; Hideo Takagi, Yokohama, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/689,770

(22) Filed: Oct. 13, 2000

(30) Foreign Application Priority Data

Oct. 14, 1999 (JP) .................................................. 11-291778

(51) Int. Cl.[7] ............................ B62D 27/02; B60N 2/427
(52) U.S. Cl. .................... 296/188; 296/68.1; 297/216.13
(58) Field of Search ................................. 296/68.1, 188; 297/216.1, 216.13, 216.18

(56) References Cited

U.S. PATENT DOCUMENTS

| 5,407,244 | * | 4/1995 | Nakano et al. | 296/68.1 |
| 5,584,525 | * | 12/1996 | Nakano et al. | 296/68.1 |

FOREIGN PATENT DOCUMENTS

| 2816318 | * | 10/1978 | (DE) | 296/68.1 |
| 5-301552 | | 11/1993 | (JP) | |
| 6-1174 | | 1/1994 | (JP) | |
| 7-267038 | | 10/1995 | (JP) | |
| 9-169232 | | 6/1997 | (JP) | |

* cited by examiner

Primary Examiner—Dennis H. Pedder
(74) Attorney, Agent, or Firm—Foley & Lardner

(57) ABSTRACT

A vehicle body structure is provided to ensure a sufficient space in a passenger's room of a vehicle and bear an impact load inputted to the vehicle's part higher than a floor tunnel. The vehicle body structure includes a center pillar 1, a front door, a rear door, a floor panel 4 arranged at the bottom of the passenger's room, a floor tunnel 5 formed to project upward at the center of the floor panel 4 of the vehicle's width direction and also extend in the fore-and-aft direction of the vehicle body, and a passenger's seat 7 arranged on the floor panel 4. The structure further includes a load-direction converting member 28 for transmitting the impact load toward the floor tunnel 5. The load-direction converting member 28 is formed with a lower frame 21a of a seat back frame 21 as the framework of the passenger's seat 7.

17 Claims, 24 Drawing Sheets

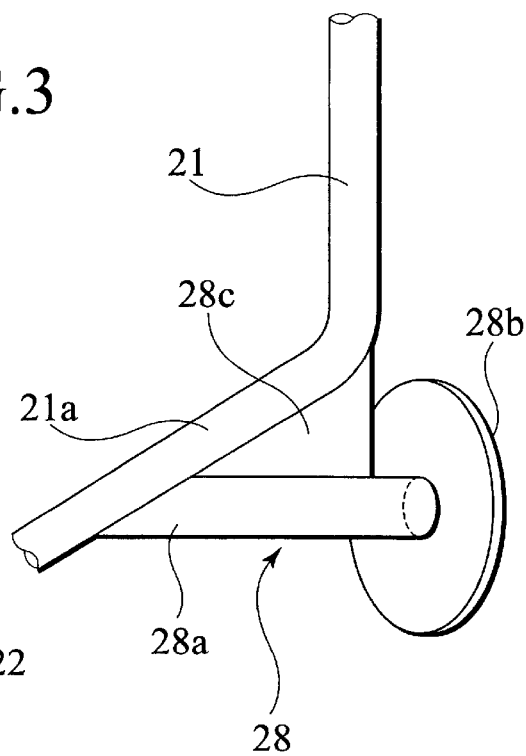
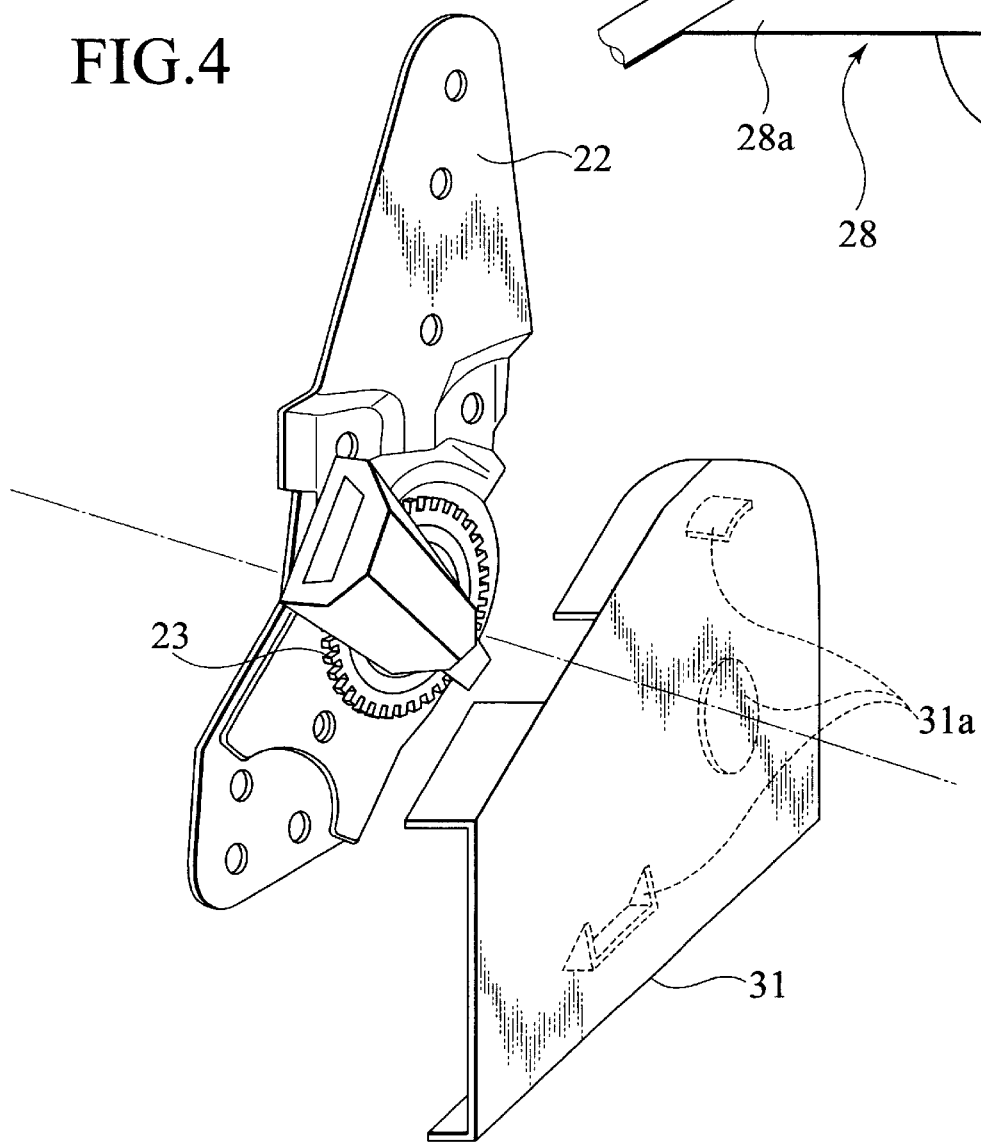

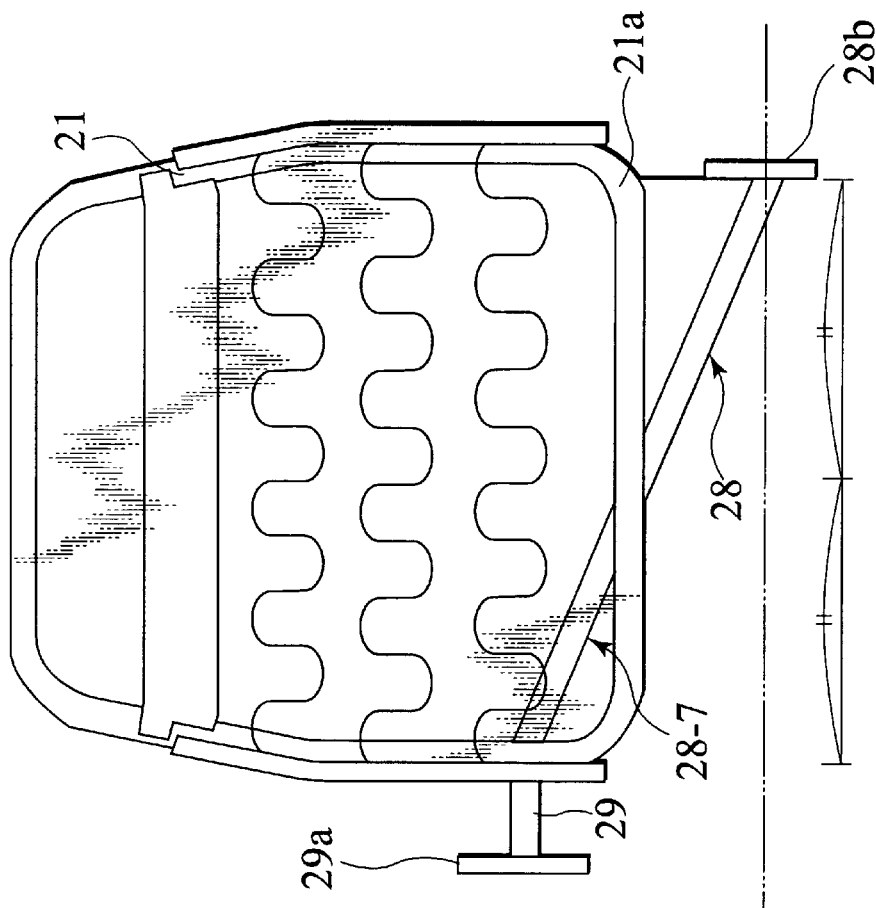
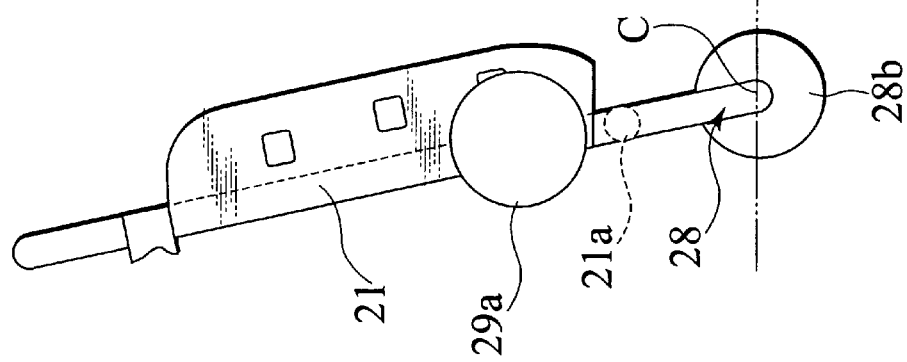

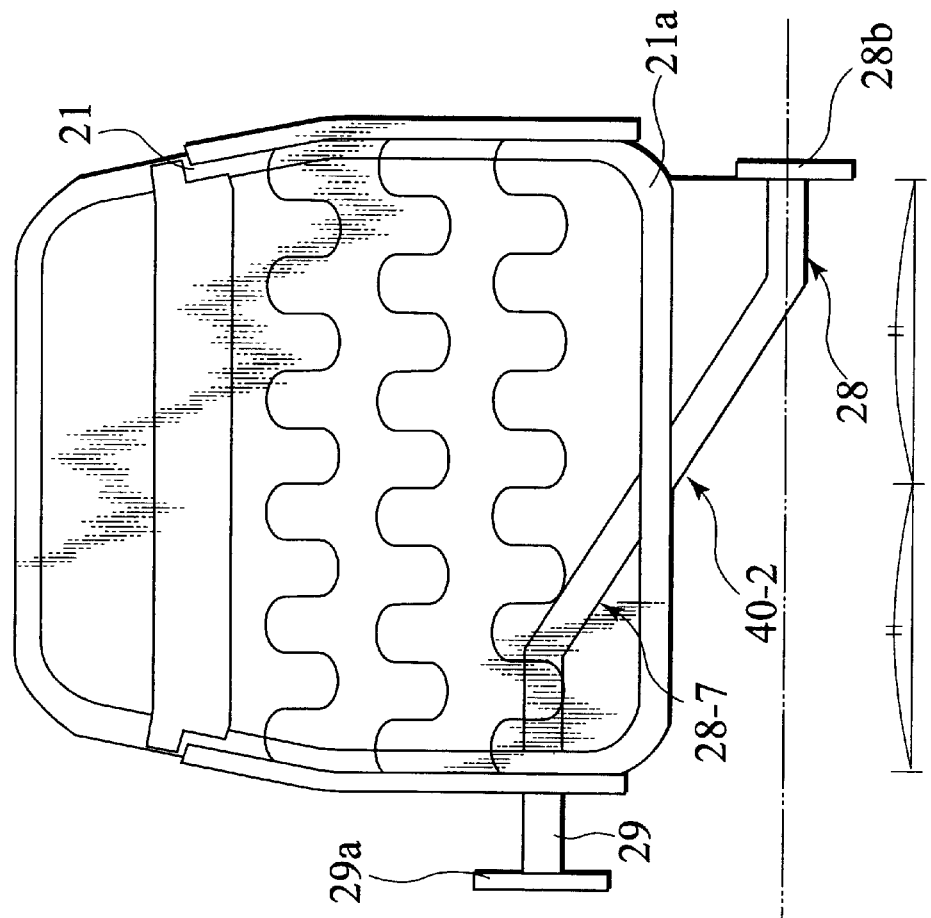
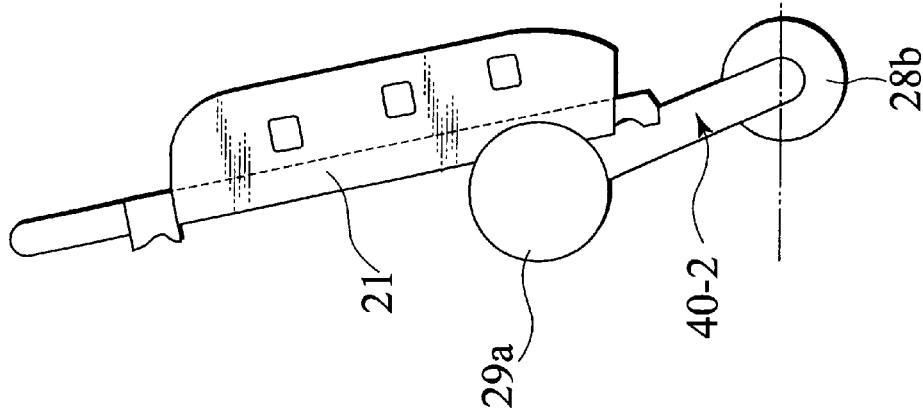
FIG. 24A
FIG. 24B

VEHICLE BODY STRUCTURE

BACKGROUND OF THE INVENTION

1. Field of the Invention

The present invention relates to a vehicle body structure which is capable of absorbing a collision energy exerted on the lateral side of the vehicle body, effectively.

2. Description of the Related Art

Japanese Patent Unexamined Publication (kokai) No. 6-1174 discloses one vehicle body structure where a reinforcement member is arranged in a passenger's seat so as to extend to the direction of the width of a vehicle, which will be referred "vehicle's width direction" hereinafter.

However, since the reinforcement member is arranged generally parallel with the above vehicle's width direction at a low position inside the passenger's seat (substantially level with a reclining device), it is difficult in the above-mentioned structure to sufficiently bear a load inputted from a high position at the vehicle side collision with another vehicle having a bumper arranged at a relatively-high position, for example, RV (recreational vehicle). As the structure for bearing the impact load at a high position, there are structures disclosed in Japanese Patent Unexamined Publication (kokai) Nos. 5-301552 and 7-267038. In common with the vehicle body structures, since the reinforcement member is disposed highly between left and right passenger's seats at the front, a problem arises in that it is difficult to make sure of an interior space of the passenger's room or a space for a center console to be disposed on a floor tunnel. In addition, the above vehicle body structures are apt to cause the passengers to get on and off the vehicle with difficulty. Meanwhile, Japanese Patent Unexamined Publication (kokai) No. 9-169232 discloses a vehicle body structure having a reinforcement pipe inserted into a lower part of a seat back frame. However, this structure does not operate to convert the direction of load positively. Therefore, when the seat back frame, a reclining mechanism and a floor tunnel are respectively displaced to the vehicle's height direction, a problem arises in that the load cannot be transmitted into the floor tunnel effectively, causing an insufficient absorption of energy.

SUMMARY OF THE INVENTION

Under the above circumstance, it is an object of the present invention to provide a vehicle body structure, which can ensure a sufficient space in the passenger's room of the vehicle and which can absorb a collision energy by effectively bearing an impact load that has been inputted from the side of the vehicle to the vehicle's part higher than the floor tunnel.

According to the invention, the above-mentioned object is accomplished by a vehicle body structure, comprising:

- a center pillar arranged on a lateral side of a passenger's room to extend up and down, the passenger's room being defined by the vehicle body;
- a side panel positioned in front and behind the center pillar, respectively;
- a floor panel arranged at the bottom of the passenger's room;
- a floor tunnel formed to project upward at the center of the floor panel of the vehicle's width direction and also extend in the fore-and-aft direction of the vehicle body;
- a passenger's seat arranged on the floor panel, between the floor tunnel and the side panel; and
- a load-direction converting member has an input part to receive a side impact load and an output part to transmit the side impact load to the floor tunnel, the input part being arranged higher than the output part.

BRIEF DESCRIPTION OF THE DRAWINGS

FIG. 3 is a perspective view of a load-direction converting member as a constituent of the vehicle body structure of the first embodiment;

FIG. 4 is a perspective view of a reinforcement member for a reclining device of the vehicle body structure of the first embodiment;

FIG. 21A is a side view of the seat back frame inside the seat forming the vehicle body structure of the seventh embodiment; and FIG. 21B is a front view of the above seat back frame;

FIG. 24A is a side view of the seat back frame inside the seat forming the vehicle body structure of the ninth embodiment; and FIG. 24B is a front view of the above seat back frame;

DESCRIPTION OF THE PREFERRED EMBODIMENT

Figure 1:
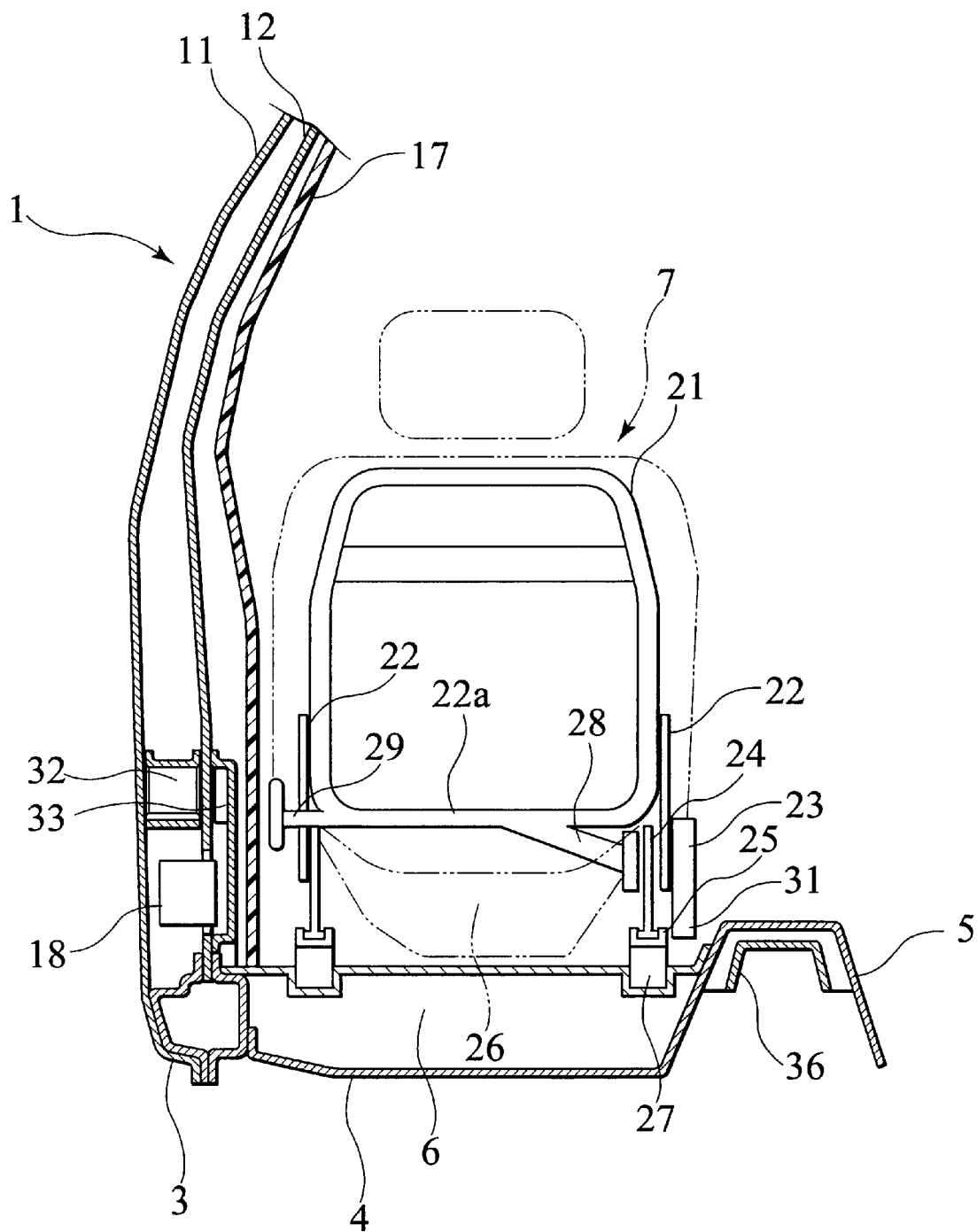
FIG. 1 is a sectional view of a vehicle body structure in accordance with the first embodiment of the present invention, also viewed from the front side of the vehicle.

Referring to accompanying drawings, various embodiments of the present invention will be described below.

[1st. Embodiment]

FIGS. 1 to 8 illustrate the first embodiment of the present invention. In these figures, reference numeral 1 designates a center pillar as one framework member, which is arranged on one lateral side of a passenger's room to extend up and down. The center pillar 1 has an outer pillar member 11 and an inner pillar member 12. Beneath the center pillar 1, a side sill 3 is formed to extend in a fore-and-aft direction of the vehicle. The side sill 3 is joined to a lateral end of a floor panel 4 disposed at the bottom of the passenger's room. The floor panel 4 is provided, at its center in the vehicle's width direction, with a floor tunnel 5 that projects upward and also extends in the fore-and-aft direction of the vehicle. Welded to the so-formed floor panel 4 is a floor cross member 6 which extends between the side sill 3 and the floor tunnel 5 in the vehicle's width direction. Of course, the floor panel 4 has another floor cross member (not shown) welded thereto on the opposite side of the member 6 over floor tunnel 5. A front door 9 (side panel) is arranged in front of the center pillar 1. A rear door 10 is also arranged behind the center pillar 1. Both of the front door 9 and the rear door 10 form a side panel of the invention, which is arranged on one lateral side of the passenger's room. In this way, the above-mentioned elements form a vehicle body as the basic structure. A resinous pillar garnish 17 is attached to the inner pillar member 12 of the center pillar 1. Additionally, seat rails 25 in pairs are respectively fixed on seat legs 27 so as to extend in the fore-and-aft direction of the vehicle. The seat legs 27 are fixed on the floor cross member 6 on the floor panel 4. A passenger's seat 7 is slidably mounted on the seat rails 25. The seat 7 has a seat back frame 21, a seat pan 26, a pair of reclining plates 22, a reclining device 23 and a pair of seat base plates 24.

Figure 2B:
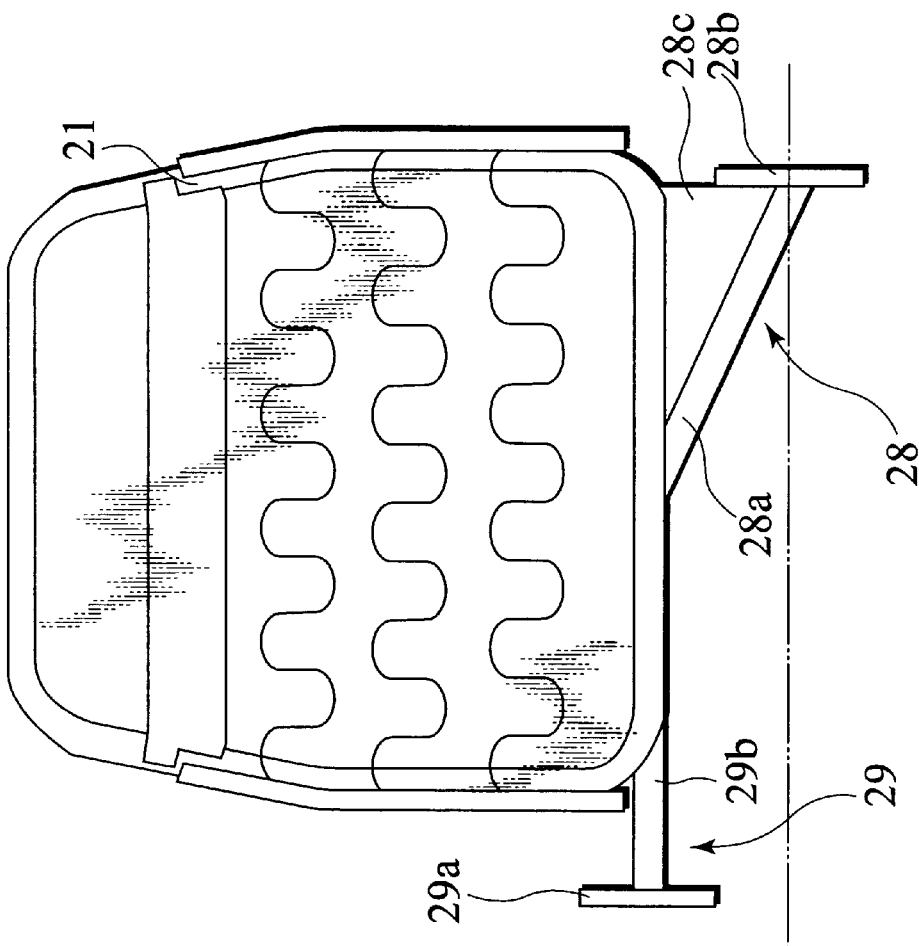
FIG. 2B is a front view of the above seat back frame.
Figure 2A:
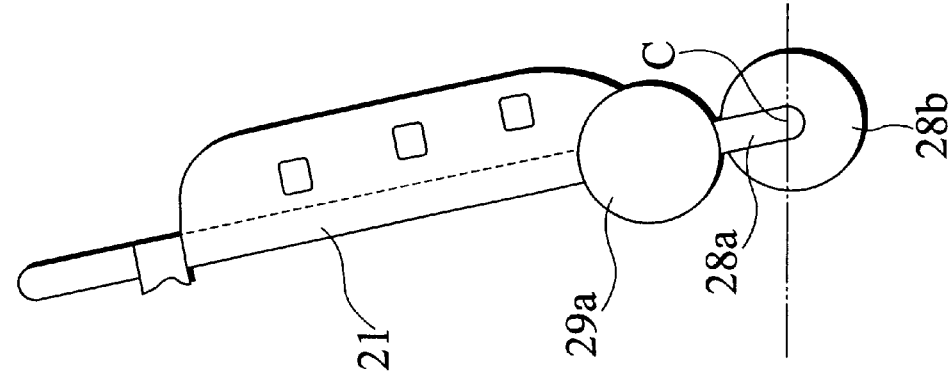
FIG. 2A is a side view of a seat back frame inside a seat forming the vehicle body structure of the first embodiment.

The seat back frame 21 has a lower frame (lower frame part) 21a formed in integral therewith. On the side of the vehicle body's center of the vehicle's width direction, the lower frame 21a has a load-direction converting member 28 extending downward. As shown in FIG. 3 in detail, the load-direction converting member 28 has a pipe 28a and flat plates 28b, 28c. The pipe 28a (input part) has an outer end (in the vehicle's width direction) welded to a general center of the lower frame 21a of the seat back frame 21 and an inner end (on the side of the vehicle body's center in the vehicle's width direction) welded to a circular plate 28b (output part), providing an inclined part extending obliquely downward. The triangular plate 28c is welded between the pipe 28a and the lower frame 21a of the seat back frame 21. As shown in FIG. 2A, the circular plate 28b is adjusted so that its center accords with a seat reclining center C on the center axis of the reclining rotation of the passenger's seat. Also, the plate 28b is positioned to define a clearance against the seat base plate 24 in the vehicle's width direction. A load transmitting member 29 projecting outward is welded to an outer end (in the vehicle's width direction) of the lower frame 21a of the seat back frame 21. The load transmitting member 29 comprises a circular plate 29a and a pipe 29b having an outer end welded to the plate 29a. The load transmitting member 29 opposes the outer end of the load-direction converting member 28 through the seat back frame 21.

Arranged between the floor tunnel 5 and the reclining device 23 of the passenger's seat 7 on the lateral side of the floor tunnel 5 is a reclining device reinforcement member 31 which is composed of a flat plate for covering the reclining device 23 to possess a reinforcing function operative to the vehicle's width direction, as shown in FIG. 4. Although the "reclining device" reinforcement member 31 may be made of resinous material, it may be made of metal, preferably. Also, the member 31 is arranged so as to overlap with the floor tunnel 5 in the upward-and-downward direction of the vehicle. In order to improve the efficiency in transmitting the load, the "reclining device" reinforcement member 31 is provided, on an inner coated face thereof, with several ribs 31a extending in the vehicle's width direction to abut against the reclining device 23. Owing to the provision of the ribs 31a, it is possible to reduce a clearance between the reclining device 23 and the "reclining device" reinforcement member 31.

Figure 5:
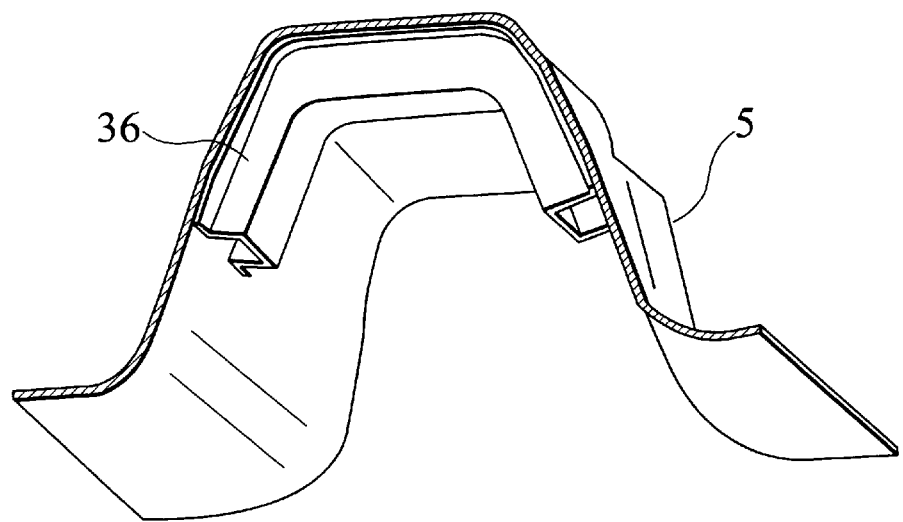
FIG. 5 is a perspective view of an in-tunnel reinforcement member of the vehicle body structure of the first embodiment.
Figure 6:
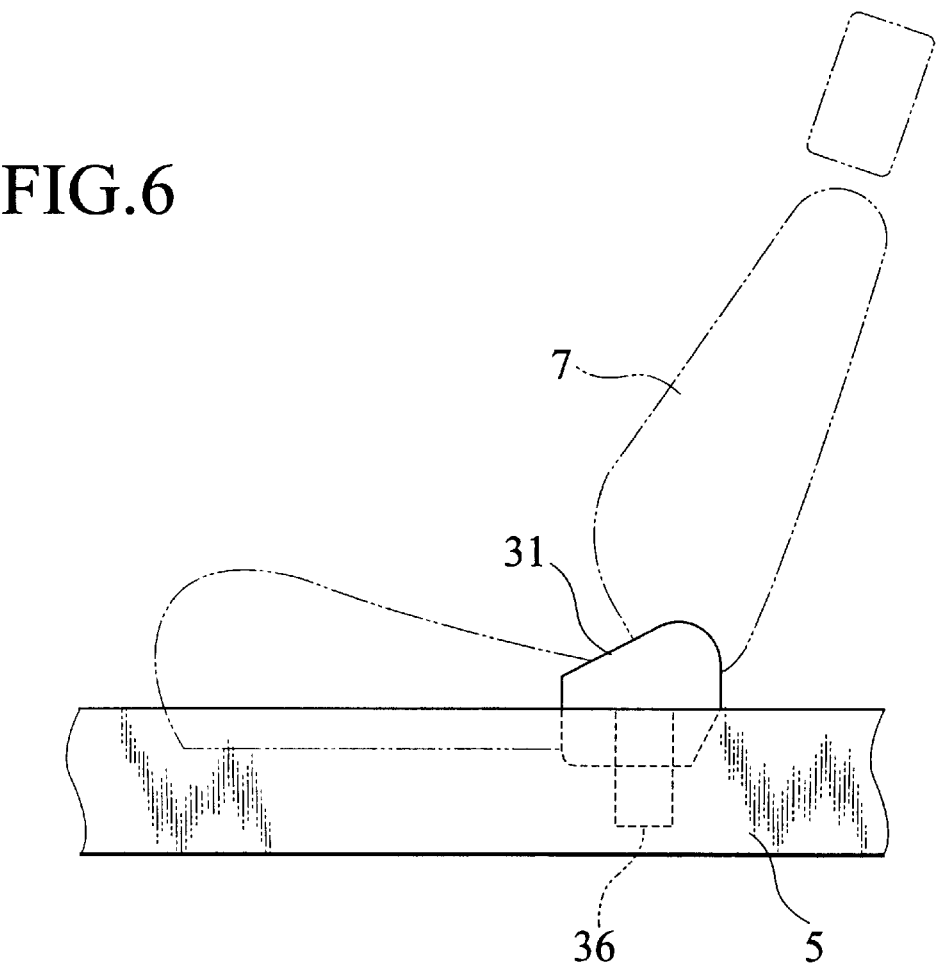
FIG. 6 is a side view showing the vicinity of the in-tunnel reinforcement member of the vehicle body structure of the first embodiment.

As shown in FIGS. 5 and 6, the floor tunnel 5 is provided, inside thereof, with a reinforcement member 36 which is operative in the vehicle's width direction. The "in-tunnel" reinforcement member 36 is welded to the inside face of the floor tunnel 5 from the underside, in a position to oppose the reclining device 23 in case of the slidable passenger's seat 7 being in its neutral position. In order to draw a distinction between various reinforcement members mentioned later, the reinforcement member 36 will be referred as "in-tunnel reinforcement member", hereinafter. The in-tunnel reinforcement member 36 has a hat-shaped cross section projecting downward and forms a closed cross section together with the floor tunnel 5. In general, the member 36 is substantially U-shaped so as to include two ridgelines of the floor tunnel 5. In this way, even when the load-direction converting member 28 does not overlap with the ridgelines of the floor tunnel 5, the in-tunnel reinforcement member 36 reinforces the circumference of the ridgelines of the floor tunnel 5 and simultaneously reinforces the rigidity of the floor tunnel 5 against a force to open the tunnel 5. The in-tunnel reinforcement member 36 arranged to oppose the neutral position could exhibit a sufficient effect even if the passenger's seat 7 is not in the neutral position.

Figure 7:
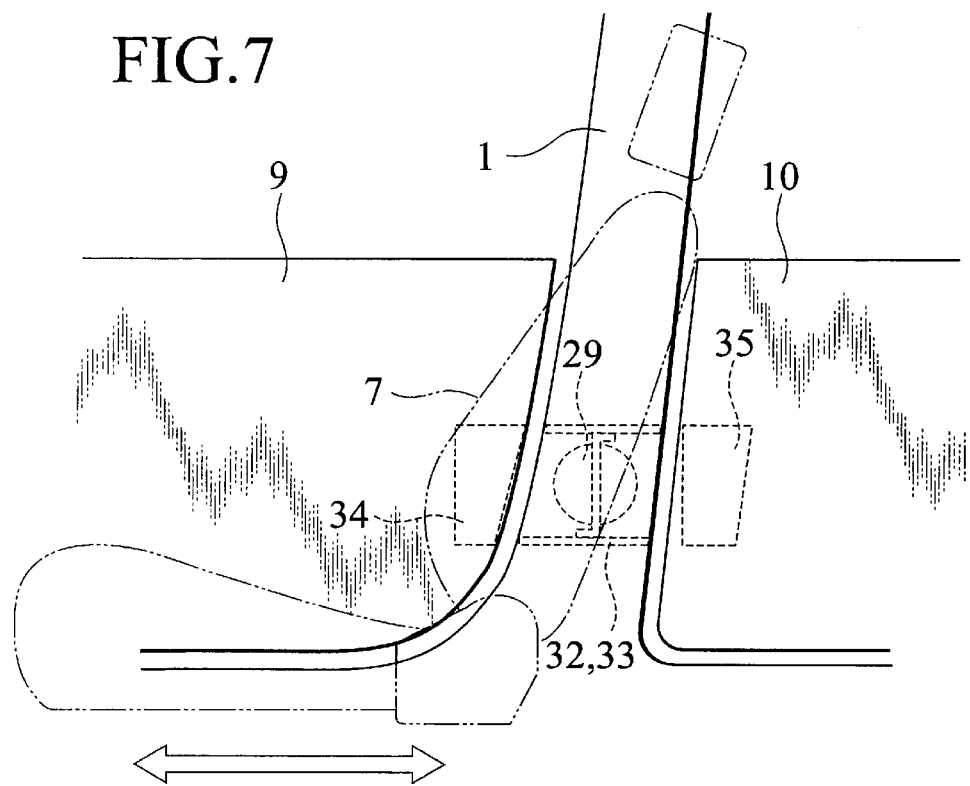
FIG. 7 is a side view of the vehicle body structure of the first embodiment, also viewed from the lateral side of the vehicle.

As shown in FIG. 7, within the operational range of the sliding and reclining passenger's seat 7, there are provided a reinforcement member 32 in a position inside the center pillar 1 opposing the load transmitting member 29 in the vehicle's width direction, and door reinforcement members (side panel reinforcement member) 34, 35 in respective positions inside the doors 9, 10 opposing the load transmitting member 29 in the vehicle's width direction. These reinforcement members 32, 34, 35 are operative to reinforce the center pillar 1, the front door 9 and the rear door 10 in the vehicle's width direction, respectively. Note that the reinforcement member 32 will be referred as "in-pillar reinforcement member", hereinafter.

Figure 8:
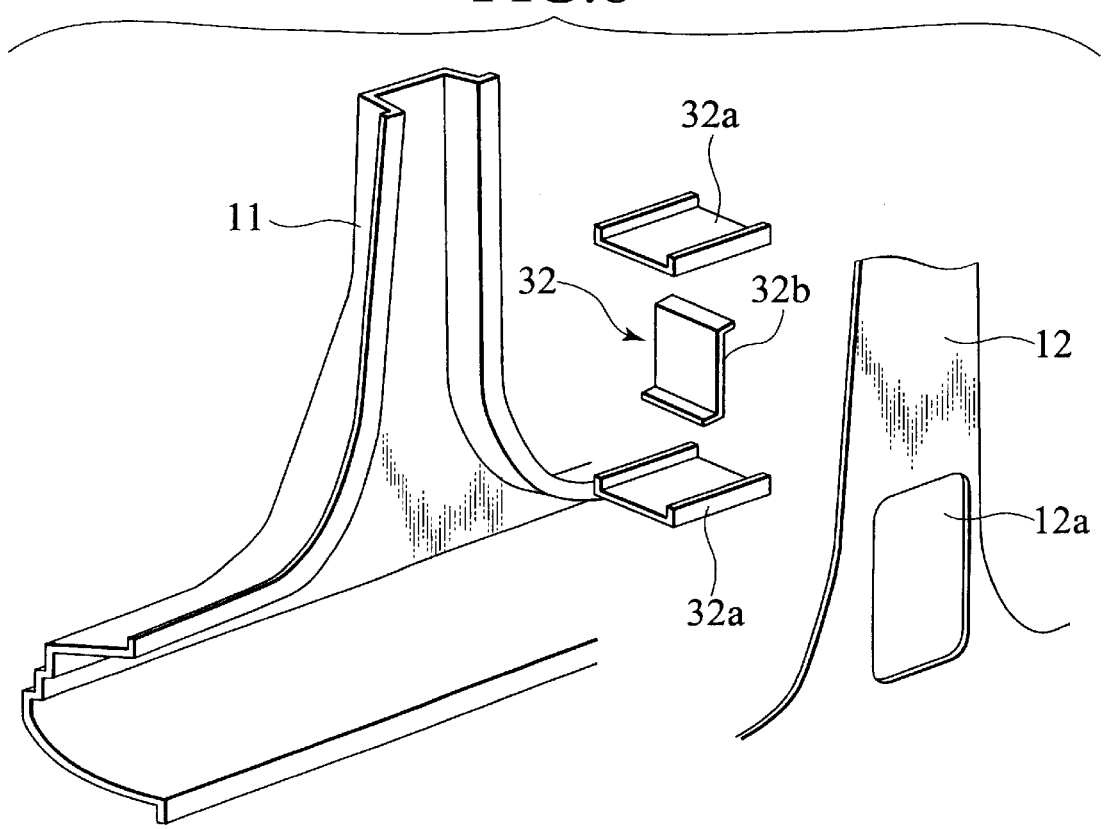
FIG. 8 is an exploded perspective view showing an in-pillar reinforcement member of the vehicle body structure of the first embodiment.
Figure 9:
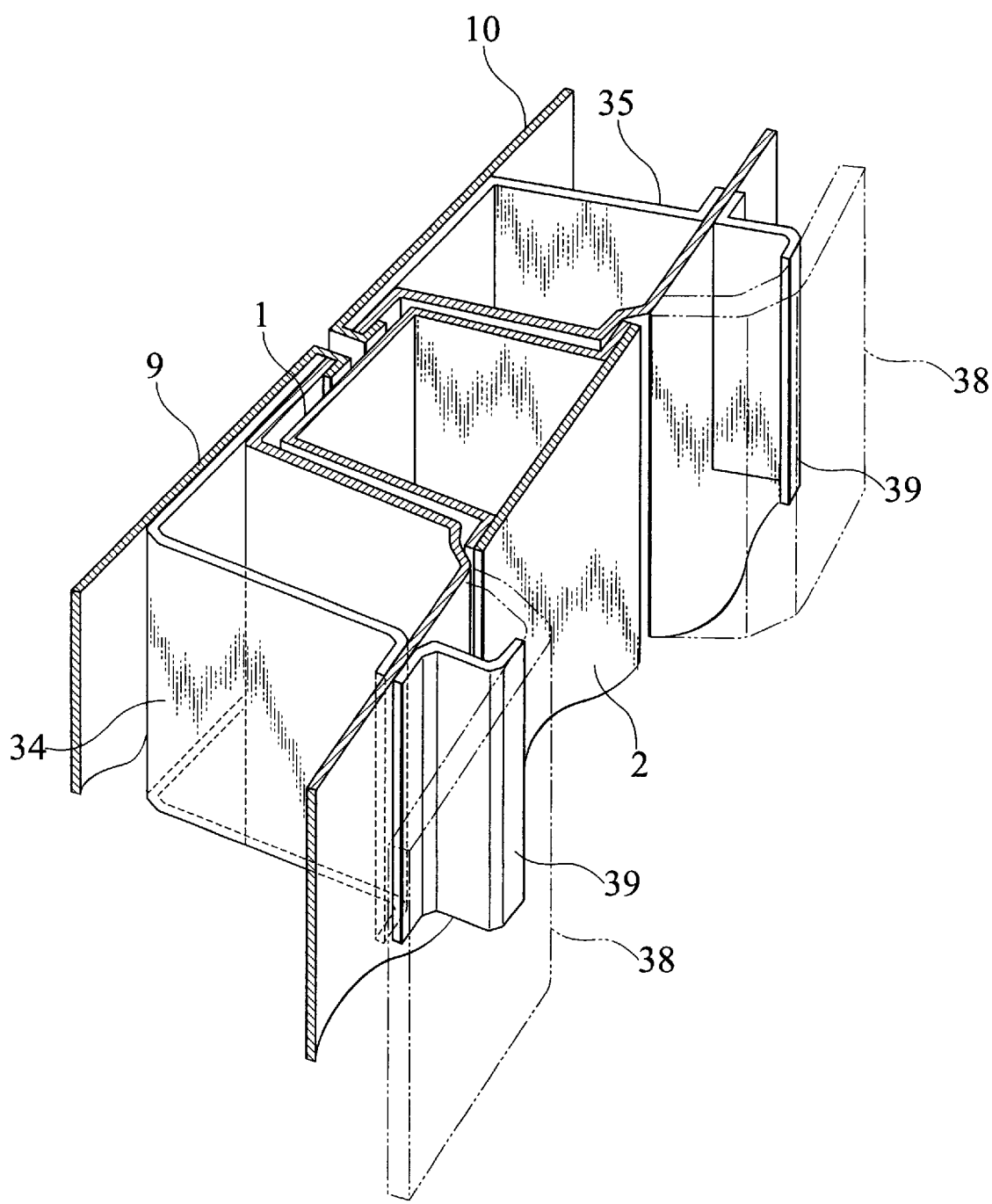
FIG. 9 is a sectional perspective view of door reinforcement members of the first embodiment.

As shown in FIG. 8, the in-pillar reinforcement member 32 has a pair of upper and lower bulkheads 32a, 32a both extending in the vehicle's width direction, and a rib 32b. As shown in FIG. 9, the door reinforcement members 34, 35 are composed of flat plates. Just like ribs extending in the doors 9, 10 to the vehicle's width direction, these members 34, 35 have respective ends hemmed in by the doors 9, 10 and other ends welded to the doors 9, 10, respectively.

Figure 10:
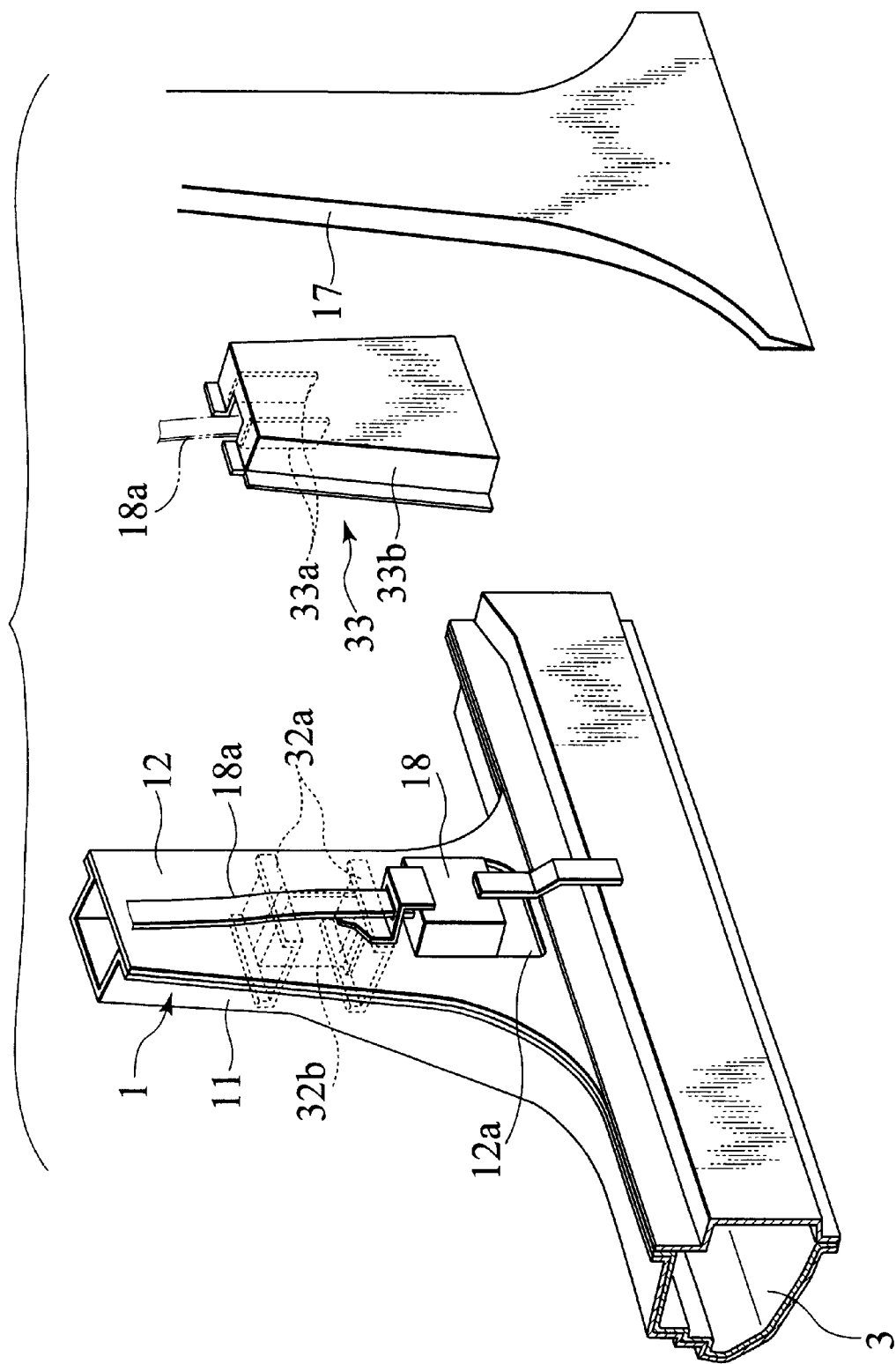
FIG. 10 is an exploded perspective view showing an in-garnish reinforcement member of the vehicle body structure of the first embodiment.
Figure 11:
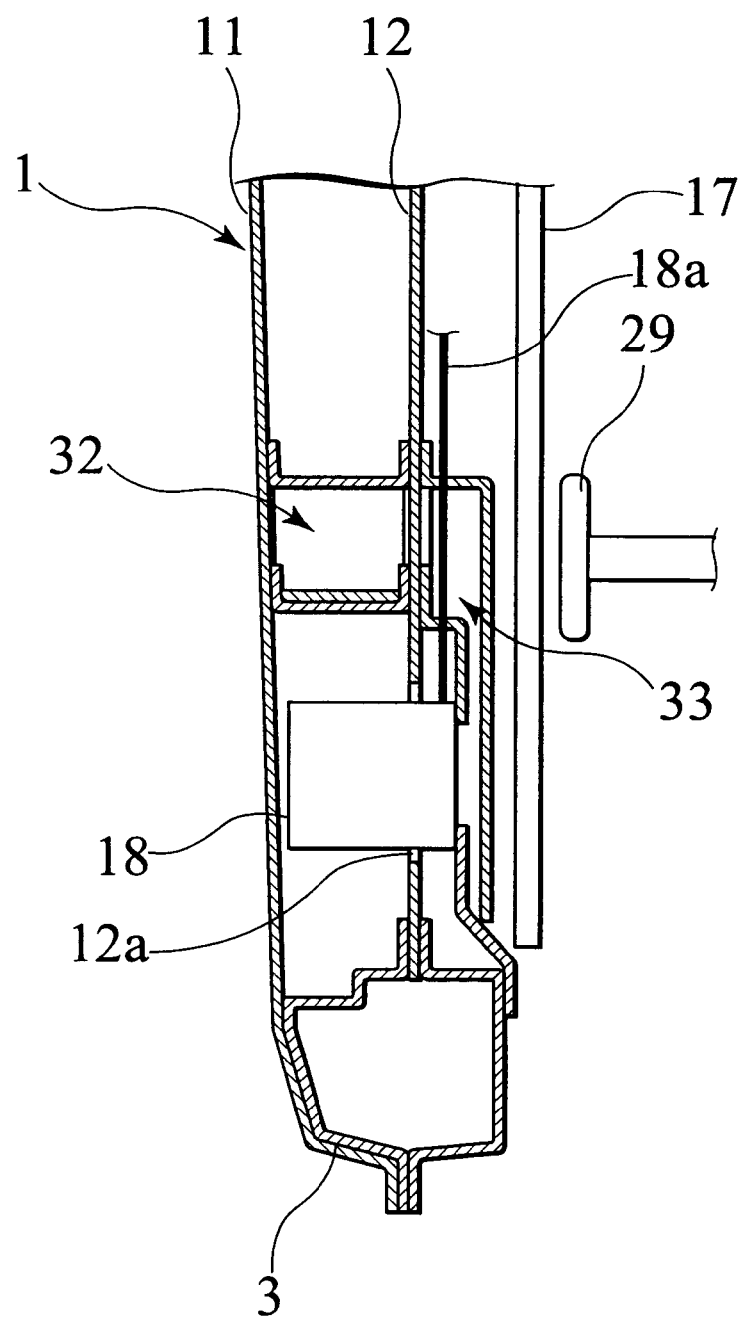
FIG. 11 is a sectional view of the circumference of a center pillar of the first embodiment, also viewed from the front side of the vehicle.

As shown in FIGS. 10 and 11, a reinforcement member 33 is arranged between the pillar garnish 17 attached to the inside of the center pillar 1, and the inner pillar member 12. The reinforcement member 33 has a reinforcing function against the pillar garnish 17 in the vehicle's width direction. Further, the member 33 is also arranged so as to oppose the load transmitting member 29. Note that the reinforcement member 33 will be referred as "ingarnish reinforcement member", hereinafter.

The in-garnish reinforcement member 33 is formed in one body with a protection lid 33b which is formed so as to cover a pillar inner hole 12a for positioning the seat belt winding unit 18 in the center pillar 1. The ingarnish reinforcement member 33 is formed with a plurality of ribs 33a extending in the vehicle's width direction. In view of the passage of a seat belt 18a, the ribs 33a are separated from each other at an interval larger than a width of the seat belt 18a.

Again, as shown in FIG. 9, the respective doors 9, 10 further include reinforcement members 39 each of which has a reinforcing function effective to the vehicle's width direction between a door trim 38 and a door inner panel.

In the vehicle body structure constructed above, the crushing strength (of the vehicle's width direction) of the passenger's seat 7 containing the load transmitting member 29, the seat back frame 21, the load-direction converting member 28 and the reclining device reinforcement member 31, is established to be larger than the crushing strength of the floor tunnel 5 containing the in-tunnel reinforcement member 36.

Next, we describe the operation of the vehicle body structure of the embodiment.

Figure 12:
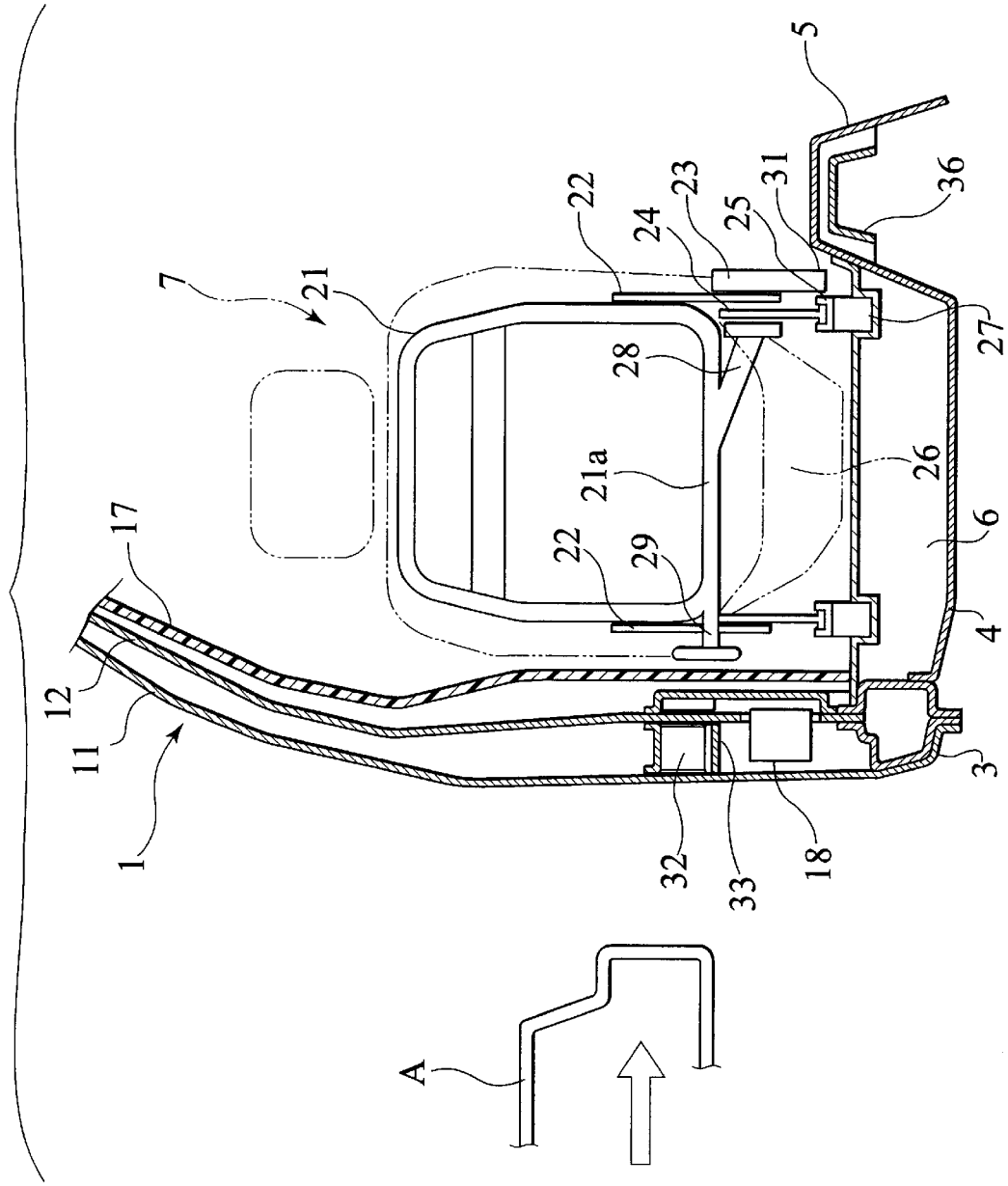
FIG. 12 is a view showing the operation of the vehicle body structure of the first embodiment, which is similar to FIG. 1.
Figure 13:
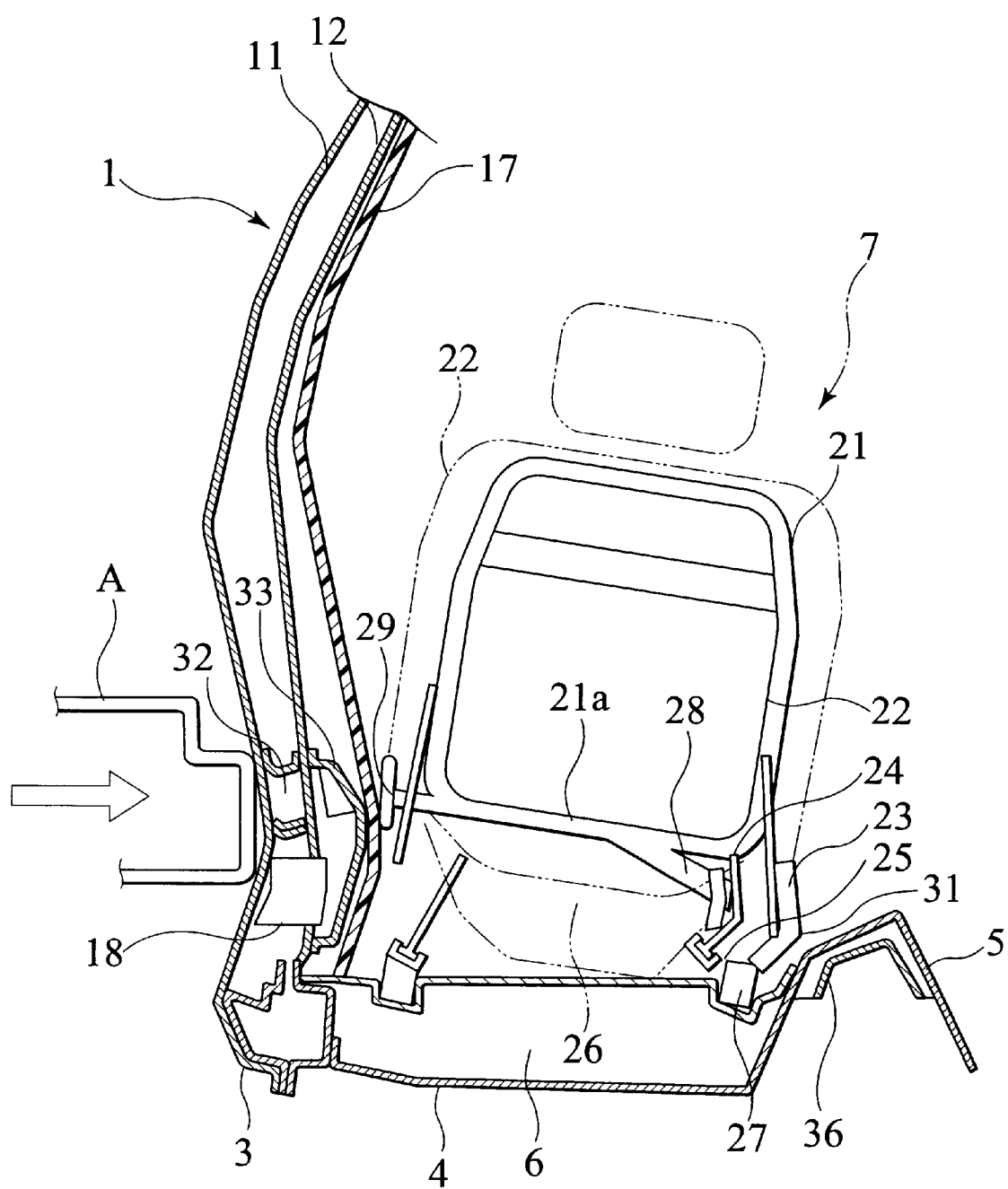
FIG. 13 is another view showing the operation of the vehicle body structure of the first embodiment, which is similar to FIG. 1.
Figure 14:
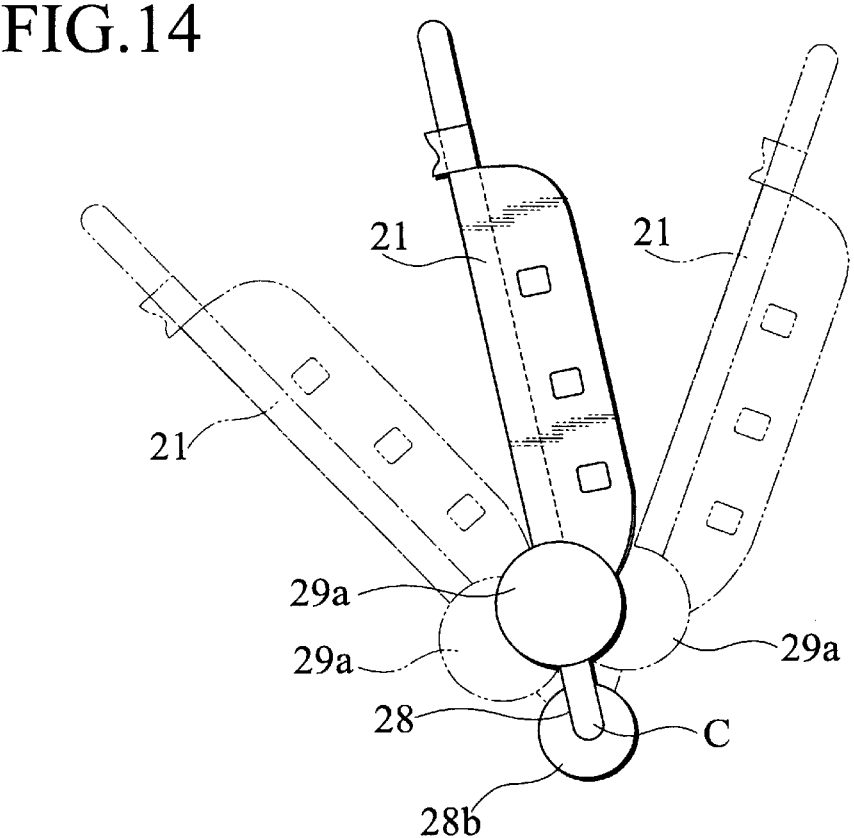
FIG. 14 is a side view of the seat back frame, also showing the relationship among a reclining angle, the load-direction converting member and a load transmitting member.

If another vehicle A with a bumper at a high position, such as RV (recreation vehicle), collides with the lateral side of the own vehicle of the embodiment thereby to generate a high side impact higher than the floor tunnel 5 (FIG. 12), then the lateral side of the vehicle begins to deform in the form of a general parabola having its peak including the bumper of the vehicle A. We now describe the operation by example of the passenger's seat 7 in a position where the load transmitting member 29 opposes the center pillar 1 in the vehicle's width direction. With the progress of deformation in the vehicle body, the load transmitting member 29 close to a height of the bumper of the vehicle A comes into contact with the pillar garnish 17, so that the passenger's seat 7 begins to move in the vehicle's width direction. Then, with a further deformation, the reclining device reinforcement member 31 comes into contact with the floor tunnel 5. The impact load applied on the seat back frame 21 being higher than the floor tunnel 5 is orientated downward by the load-direction converting member 28, so that the load is exerted to the reclining device reinforcement member 31 through the reclining device 24. The reclining device reinforcement member 31 covering the reclining device 24 transmits the load to the floor tunnel 5 through the member's (31) overlapping portion with the tunnel 5 in the upward-and-downward direction, while the floor tunnel 5 generates a crushing reactive force due to its in-plane tension. The in-pillar reinforcement member 32 and the in-garnish reinforcement member 33 serve to transmit the collision load to the floor tunnel 5 rapidly and certainly. Since the passenger's seat 7 has a crushing load (resistance) of the vehicle's width direction, which is larger than that of the floor tunnel 5, the vehicle body structure of the embodiment allows the floor tunnel 5 to be crushed in prior, absorbing the collision energy while ensuring a passenger's life space in the circumference of the seat 7. In this embodiment, since the load-direction converting member 28 converts the load from the seat back frame 21 obliquely downward, it is possible to transmit the vehicle's side input (collision impact), which is higher than the floor tunnel 5, to the same effectively. Meanwhile, since the floor tunnel 5 is reinforced by the in-tunnel reinforcement member 36 disposed in a clearance between the tunnel 5 and a not-shown heat-insulation plate thereunder, there is no need to provide a reinforcement member on the floor tunnel 5 while exerting no influence on the layout of a console box and the space in the passenger's room. In addition, the floor tunnel 5 could be effectively reinforced since it is a structural member originally. If the load is transmitted to the vicinities of ridgelines of the tunnel 5, then it is possible to increase the energy absorption reasonably (see FIG. 13).

The provision of the lower frame 21a with the load-direction converting member 28 allows the existing frame structure to be modified less. Further, since the pipe 28a of the member 28 is inclined to the lower frame 21a, it is possible to direct the load being inputted to the higher position on the vehicle body, to the floor tunnel 5 obliquely downward.

Owing to the provision of the load transmitting member 29, the in-pillar reinforcement member 32, the in-garnish reinforcement member 33 and the reclining device reinforcement member 31, it is possible to transmit the input load to the floor tunnel 5 rapidly. Further, by the in-pillar reinforcement member 32, the in-garnish reinforcement member 33 and the reclining device reinforcement member 31, it is possible to prevent the center pillar 1, the pillar garnish 17 and the reclining device 23 from being crushed, accomplishing to start the energy absorption by the floor tunnel 5 early.

The above-mentioned operation in case of the load transmitting member 29 opposing the center pillar 1 is similar to the operation in case of the passenger's seat 7 in a position where the member 29 opposes the front door 9 and the rear door 10 in the vehicle's width direction.

Since the inner end of the load-direction converting member 28 is arranged in alignment with the center axis of the seat's reclining rotation, the load inputted to the seat back frame 21 can be certainly transmitted to the floor tunnel 5 through reclining device 23 and the reclining device reinforcement member 31, irrespective of the reclining angle of the seat 7. Additionally, as the load transmitting member 29 is positioned in general level with the lower part of the seat back frame 21, it is possible to receive the impact load (at a high position) from the recreation vehicle (RV) certainly and possible to minimize the reinforcing area about the center pillar 1 and the doors 9, 10 due to the reduced influence by the reclining angle.

[2nd. Embodiment]

Figure 15:
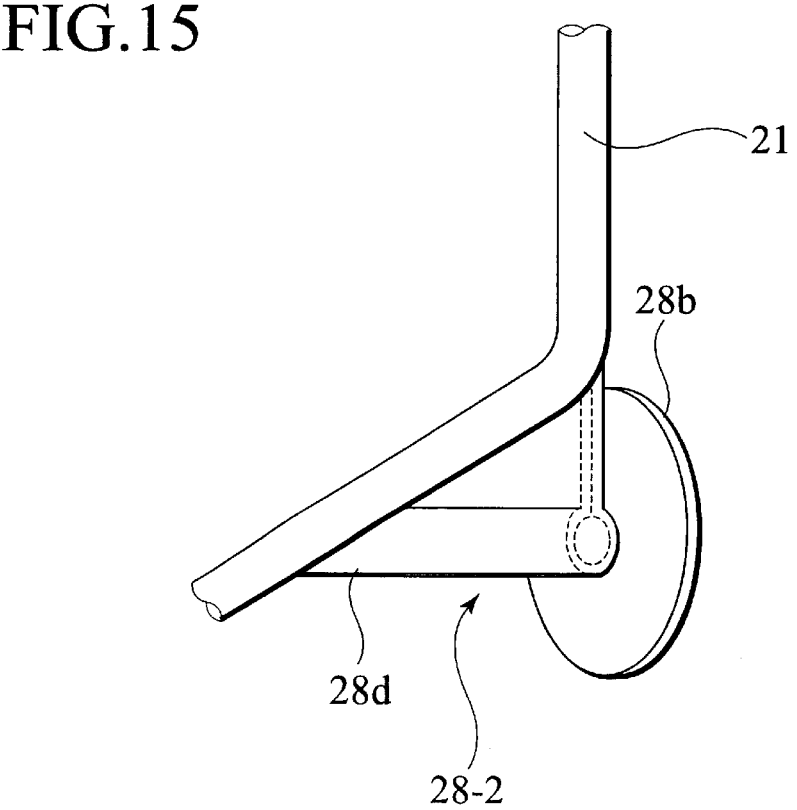
FIG. 15 is a perspective view of the load-direction converting member of the vehicle body structure of the second embodiment.

FIG. 15 shows the second embodiment of the present invention. Note that, in this figure, an element corresponding to the load-direction converting member 28 of the first embodiment is indicated with combined numeral 28-2 as being representing the same member in the second embodiment. The load-direction converting member 28-2 has a bending plate 28d provided as a result of bending a flat plate, instead of the pipe 28a and the flat plate 28c of the first embodiment. The second embodiment differs from the first embodiment in that a bending portion of the plate 28d corresponds to the previously-mentioned inclined part. Also in this embodiment, the so-constructed structure operates similarly to that of the first embodiment. Additionally, this embodiment has an effect to reduce the number of components, being accompanied with the reduction in manufacturing cost.

[3rd. Embodiment]

Figure 16:
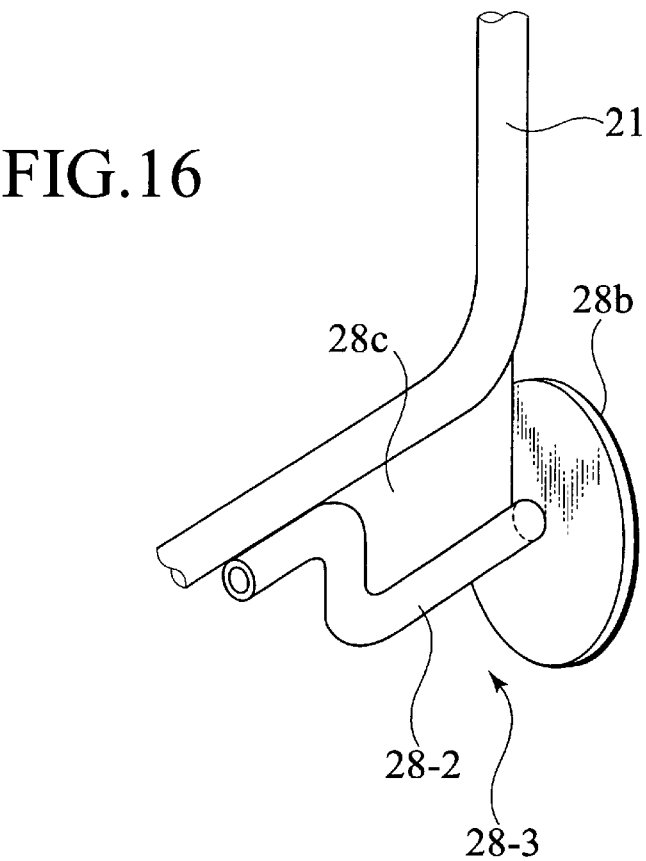
FIG. 16 is a perspective view of the load-direction converting member of the vehicle body structure of the third embodiment.

FIG. 16 shows the third embodiment of the present invention. Note that, in this figure, an element corresponding to the load-direction converting member 28 of the first embodiment is indicated with combined numeral 28-3 as being representing the same member in the third embodiment. The load-direction converting member 28-3 has a bending pipe 28a-2 provided as a result of cranking one piece of pipe, instead of the straight pipe 28a of the first embodiment. Also in this embodiment, the so-constructed structure operates similarly to that of the first embodiment. Additionally, the structure of this embodiment has an effect to increase the welding strength of the pipe 28a-2 because of a wide welding area ensured between the same pipe 28a-2 and the seat back frame 21.

[4th. Embodiment]

Figure 17:
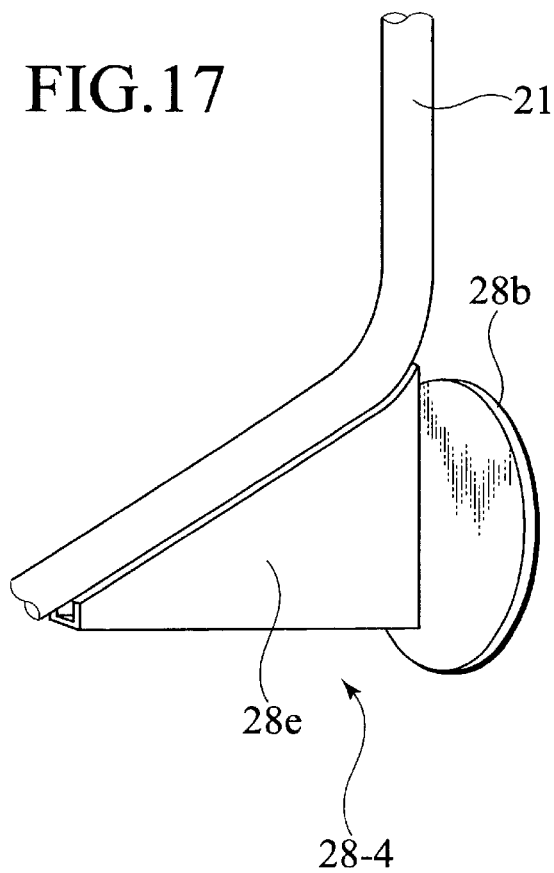
FIG. 17 is a perspective view of the load-direction converting member of the vehicle body structure of the fourth embodiment.

FIG. 17 shows the fourth embodiment of the present invention. Note that, in this figure, an element corresponding to the load-direction converting member 28 of the first embodiment is indicated with combined numeral 28-4 as being representing the same member in the fourth embodiment. The load-direction converting member 28-4 has a hat-sectional member 28e provided as a result of bending a flat plate, instead of the pipe 28a and the flat plate 28c of the first embodiment. Also in this embodiment, the so-constructed structure operates similarly to that of the first embodiment. Additionally, since the hat-sectional member 28e and the seat back frame 21 constitute a closed section, the rigidity of the structure of this embodiment can be improved with the reduction in number of components.

[5th. Embodiment]

Figure 18:
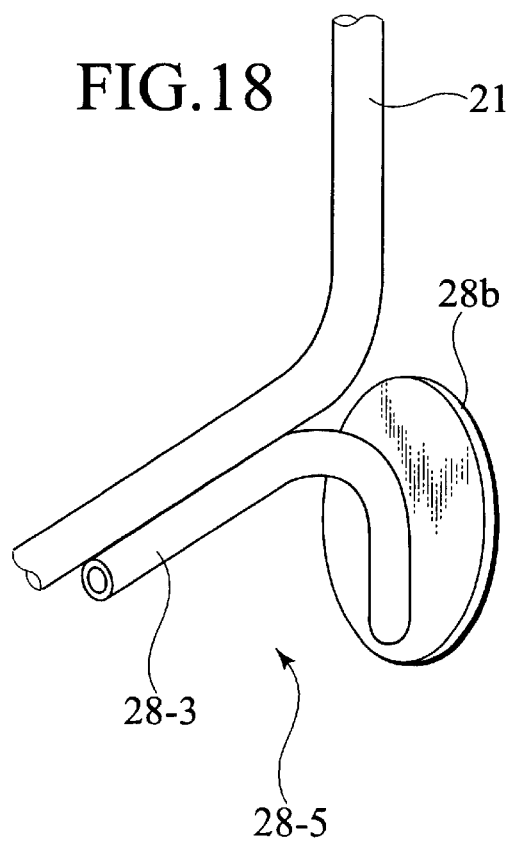
FIG. 18 is a perspective view of the load-direction converting member of the vehicle body structure of the fifth embodiment.

FIG. 18 shows the fifth embodiment of the present invention. Note that, in this figure, an element corresponding to the load-direction converting member 28 of the first embodiment is indicated with combined numeral 28-5 as being representing the same member in the fifth embodiment. The load-direction converting member 28-5 has a reinforced pipe 28a-3 provided as a result of bending a thick-wall pipe, instead of the pipe 28a and the flat plate 28c of the first embodiment. Also in this embodiment, the so-constructed structure operates similarly to that of the first embodiment. Additionally, since a wide space is ensured just below the seat back frame 21, it is possible to improve the degree of freedom with respect to the layout of the seat.

[6th. Embodiment]

Figure 19:
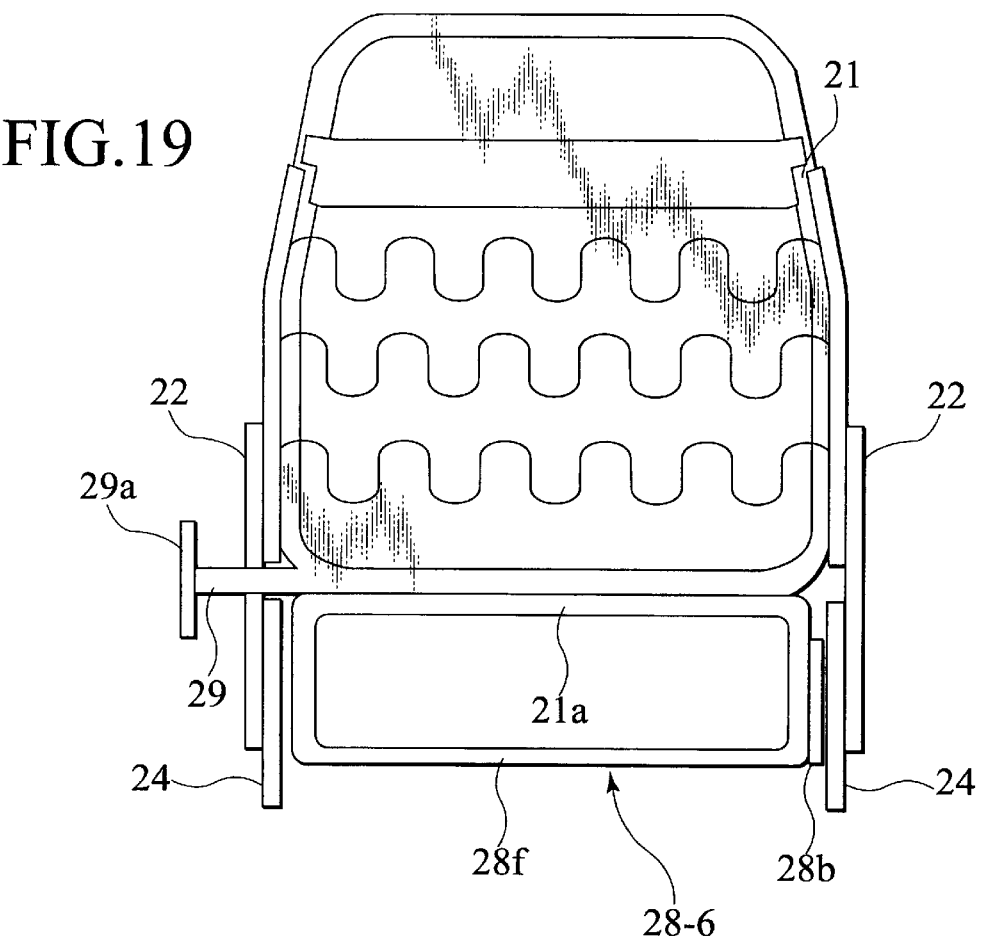
FIG. 19 is a front view of the seat back frame inside the seat of the sixth embodiment.
Figure 20:
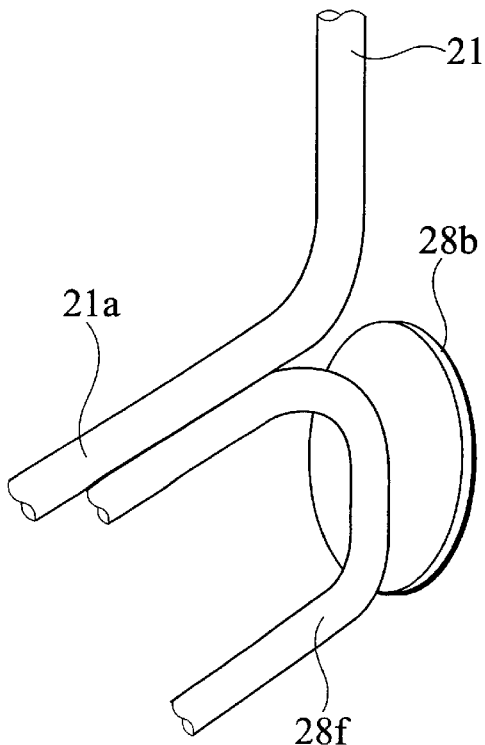
FIG. 20 is a perspective view of the load-direction converting member of the vehicle body structure of the sixth embodiment.

FIGS. 19 and 20 show the sixth embodiment of the present invention. Note that, in these figures, an element corresponding to the load-direction converting member 28 of the first embodiment is indicated with combined numeral 28-6 as being representing the same member in the sixth embodiment. The load-direction converting member 28-6 has a rectangular pipe frame 28f disposed between the left and right seat base plates 24, 24 on both sides of the seat back frame 21, and the circular plate 28b. In assembly, the pipe flame 28f has an upper frame part welded to the lower frame 21a of the seat back frame 21. Also in this embodiment, the so-constructed structure operates similarly to that of the first embodiment. Additionally, since a wide space can be ensured just below the seat back frame 21, it is possible to improve the degree of freedom with respect to the layout of the seat. Owing to the provision of the pipe frame 28f, it is also possible to improve an efficiency in transmitting the impact load.

[7th. Embodiment]

Figure 22:
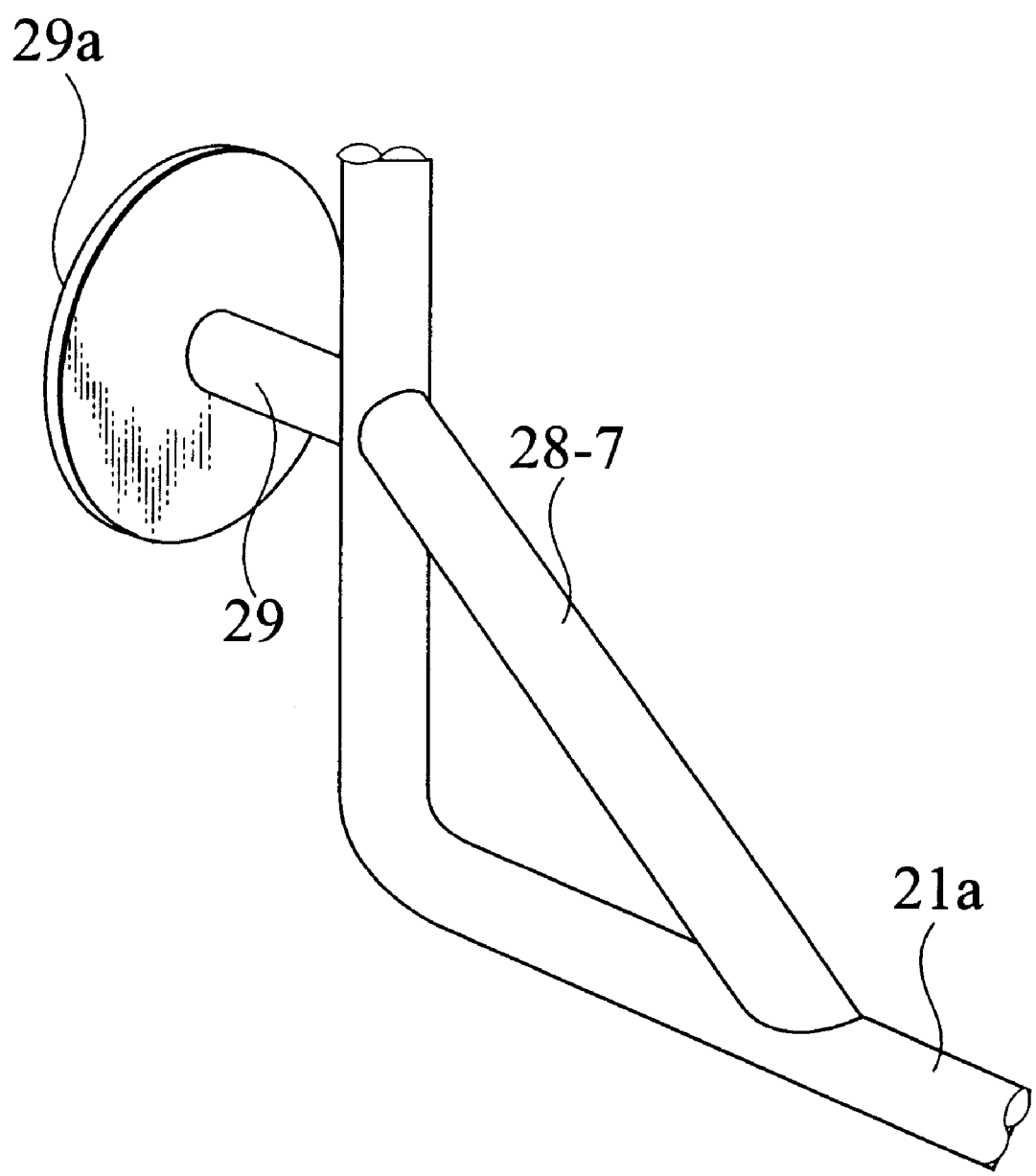
FIG. 22 is a perspective view of the load-direction converting member of the vehicle body structure of the seventh embodiment.

FIGS. 21A, 21B and 22 show the seventh embodiment of the present invention. In this embodiment, an additional load-direction converting member 28-7 is arranged so as to be in general-alignment with the load-direction converting member 28 and welded to the lower frame 21a of the seat back frame 21. In detail, the outer end of the load-direction converting member 28 is welded to a substantial center of the lower frame 21a of the lo vehicle's width direction, while the inner end of the load-direction converting member 28-7 is also welded to the substantial center of the lower frame 21a. Further, the outer end of the load-direction converting member 28-7 is welded to the seat back frame's part which is in symmetrical with the reclining device 23 about the substantial center of the lower frame 21a as the symmetry center. The load transmitting member 29 is connected to the seat back frame 21 so as to oppose the above outer end of the member 28-7 in the vehicle's width direction.

Also in this embodiment, the so-constructed structure operates similarly to that of the first embodiment. Additionally, since the structure has a load-input point raised in comparison with that of the first embodiment, it is possible to transmit the load to the floor tunnel 5, corresponding to the impact load inputted at a higher position. Owing to the symmetrical arrangement of the members 28, 28-7 about the center of the lower frame 21a, it is also possible to restrict the occurrence of rotational moment acting on the passenger's seat 7. Again, owing to the linear arrangement of the members 28, 28-7, the load inputted from the vehicle's lateral side can be effectively transmitted to the floor tunnel 5 in a substantially-straight line and furthermore, it is possible to prevent the members 28, 28-7 from bending.

[8th. Embodiment]

Figure 23B:
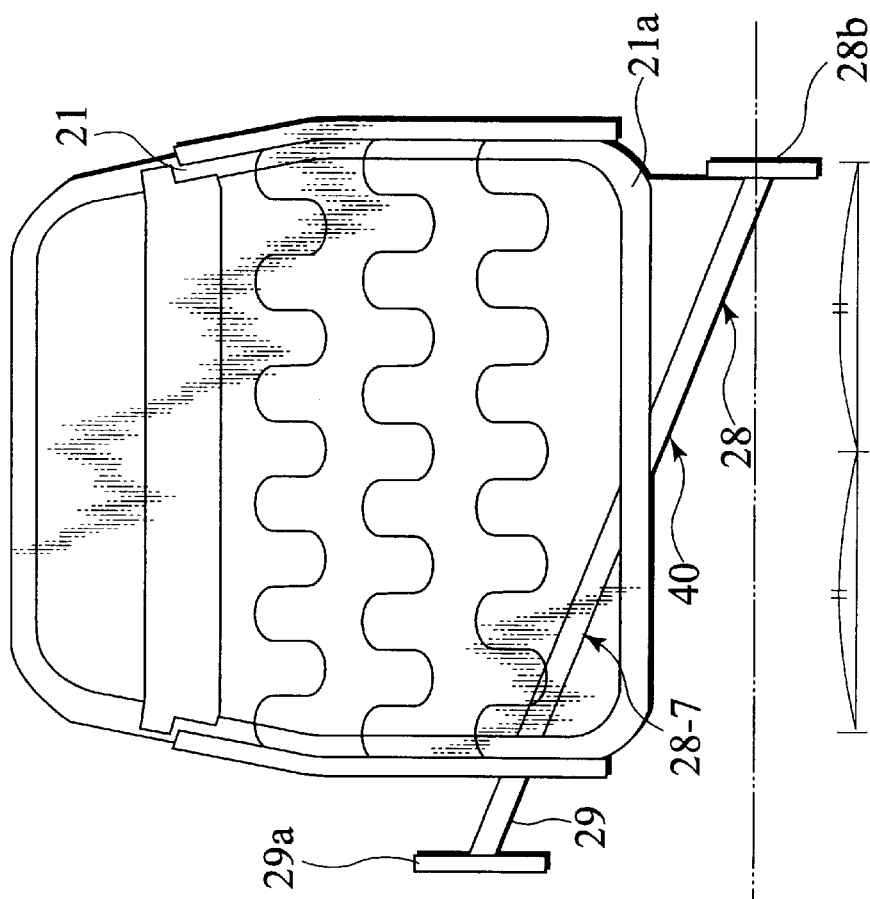
FIG. 23B is a front view of the above seat back frame.
Figure 23A:
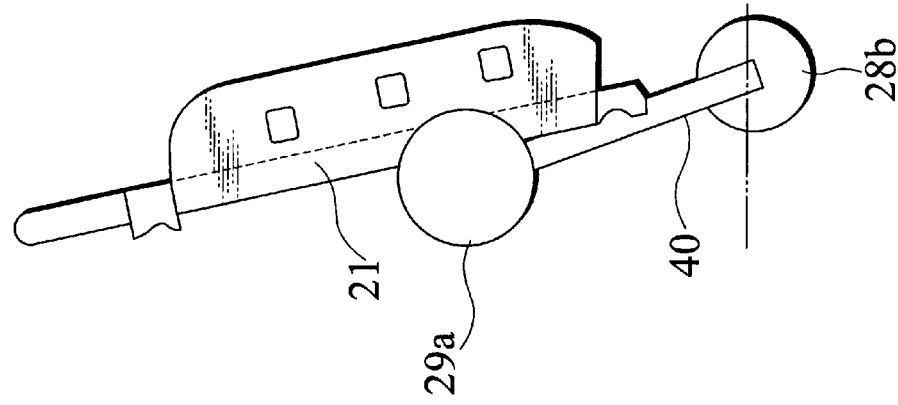
FIG. 23A is a side view of the seat back frame inside the seat forming the vehicle body structure of the eighth embodiment.

FIGS. 23A and 23B show the eighth embodiment of the present invention. Although the eighth embodiment is similar to the seventh embodiment in constitution, a load transmitting-and-converting member 40 is provided as an integrated straight member composed of the load-direction converting member 28, 28-7 and the load transmitting member 29. Upon forming a dent on the seat back frame 21, the straight member 40 is welded onto the dent of the frame 21 for integration. Also in this embodiment, it is desirable to join the load transmitting-and-converting member 40 to the lower frame 21a at its substantial center of the vehicle's width direction. The vehicle body structure of the embodiment can cope with the input at a higher position, as similar to the seventh embodiment. Additionally, since the load inputted from the load transmitting member 29 is straight transmitted to the floor tunnel 3 while converting the direction of load, it is possible to improve the transmission efficiency furthermore and also possible to prevent the member's part between the load transmitting member 29 and the load-direction converting member 28-7 or the same between the load-direction converting members 28 and 28-7 from bending. Further, the structure allows the number of components to be reduced.

[9th. Embodiment]

FIGS. 24A and 24B show the ninth embodiment of the present invention. Although the ninth embodiment is similar to the eighth embodiment in constitution, the difference resides in a load transmitting-and-converting member 40-2 obtained by bending a pipe having a diameter somewhat larger than that of the load transmitting-and-converting member 40 of the eighth embodiment. Also in this embodiment, it is desirable to join the load transmitting-and-converting member 40-2 to the lower frame 21a at its substantial center of the vehicle's width direction. The vehicle body structure of the embodiment is suitable to meet the load input lower than that of the eighth embodiment. Further, in comparison with the eighth embodiment, the structure of the embodiment remains free from the influence of reclining angle relatively.

[10th. Embodiment]

Figure 25B:
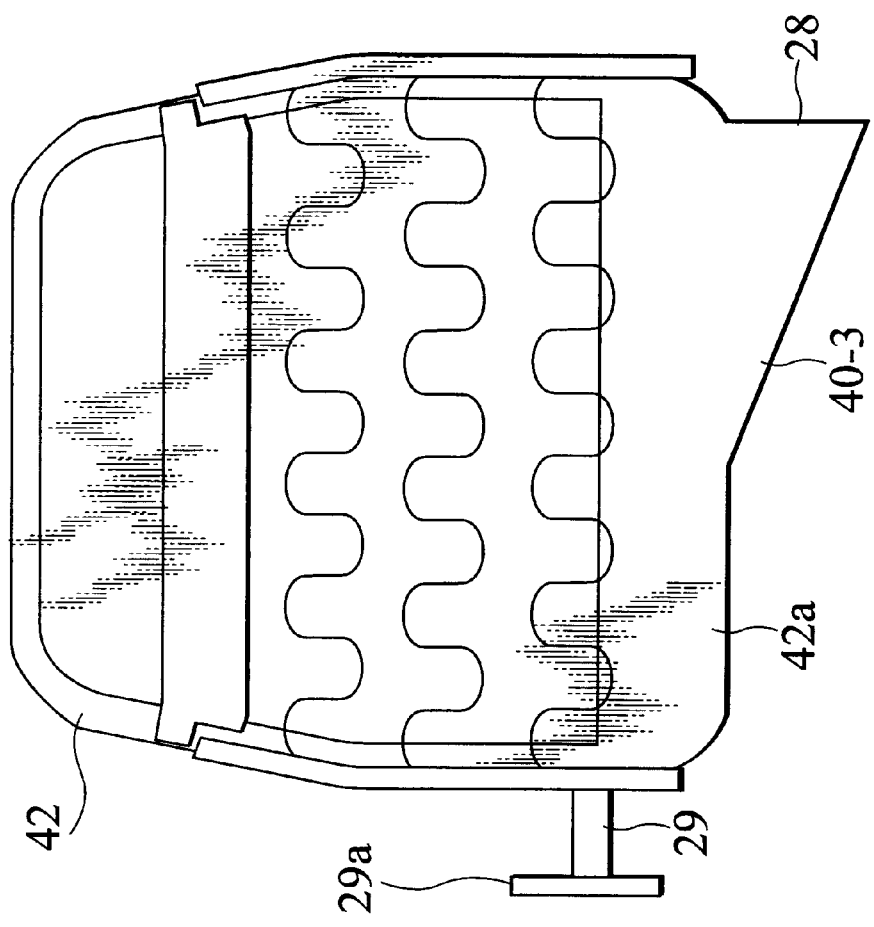
FIG. 25B is a front view of the above seat back frame.
Figure 25A:
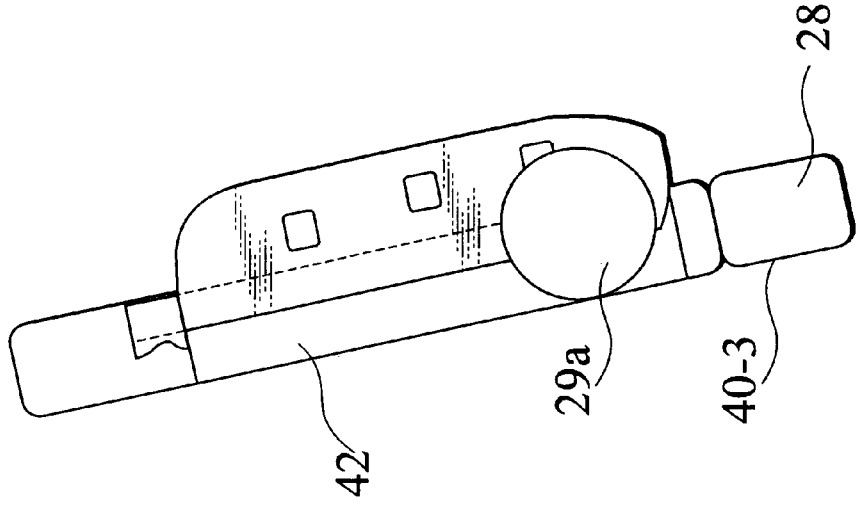
FIG. 25A is a side view of the seat back frame inside the seat forming the vehicle body structure of the tenth embodiment.

FIGS. 25A and 25B show the tenth embodiment of the present invention. According to the embodiment, a seat back frame 41 is made of a casting or the like. In the seat back frame 41, a lower frame 42a is formed to extend downward with a sufficient cross section, providing a load transmitting-and-converting member 40-3 where the load-direction converting member 28 and the load transmitting member 29 of the first embodiment are formed into one body. Also in this embodiment, the so-constructed structure operates similarly to that of the first embodiment. Additionally, this embodiment has an effect to reduce the number of components and another effect to facilitate the establishment in strength of the lower frame 42a of the seat back frame 42.

[11th. Embodiment]

Figure 26:
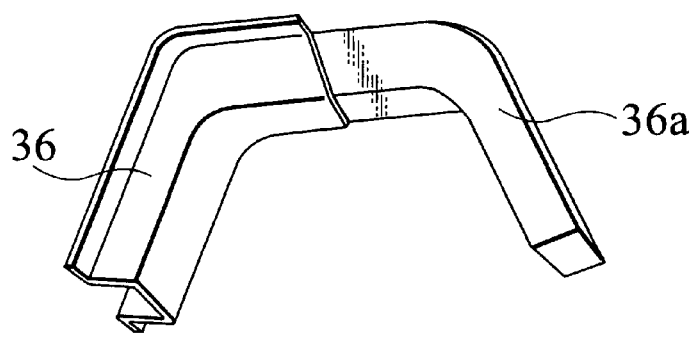
FIG. 26 is a partially-broken perspective view of the in-tunnel reinforcement member of the eleventh embodiment.

FIG. 26 shows the eleventh embodiment of the present invention. Since not-shown other elements of this embodiment are similar to those of the other embodiments respectively, the descriptions of the overlapping elements are eliminated. According to the embodiment, the closed section defined by the floor tunnel 5 and the reinforcement member 36 is filled up with a foaming resin 36a. Also in this embodiment, the so-constructed structure operates similarly to that of the first embodiment. Additionally, this embodiment has an effect to enhance an energy absorption due to its lightweight structure.

[12th. Embodiment]

Figure 27:
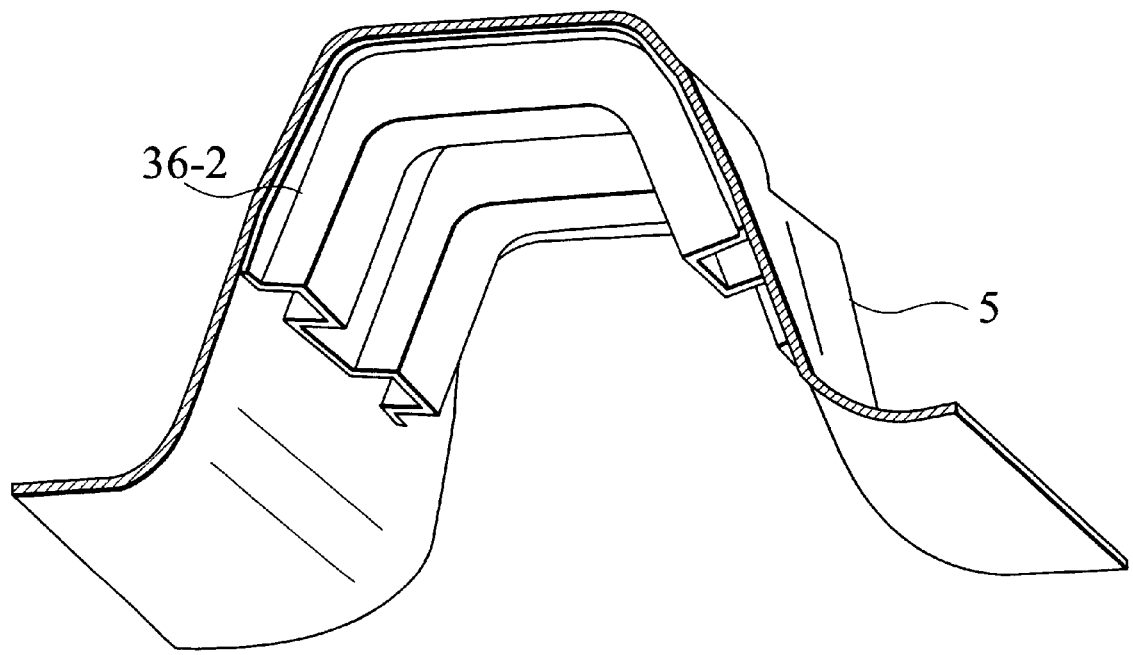
FIG. 27 is a perspective view of the in-tunnel reinforcement member of the twelfth embodiment.
Figure 28:
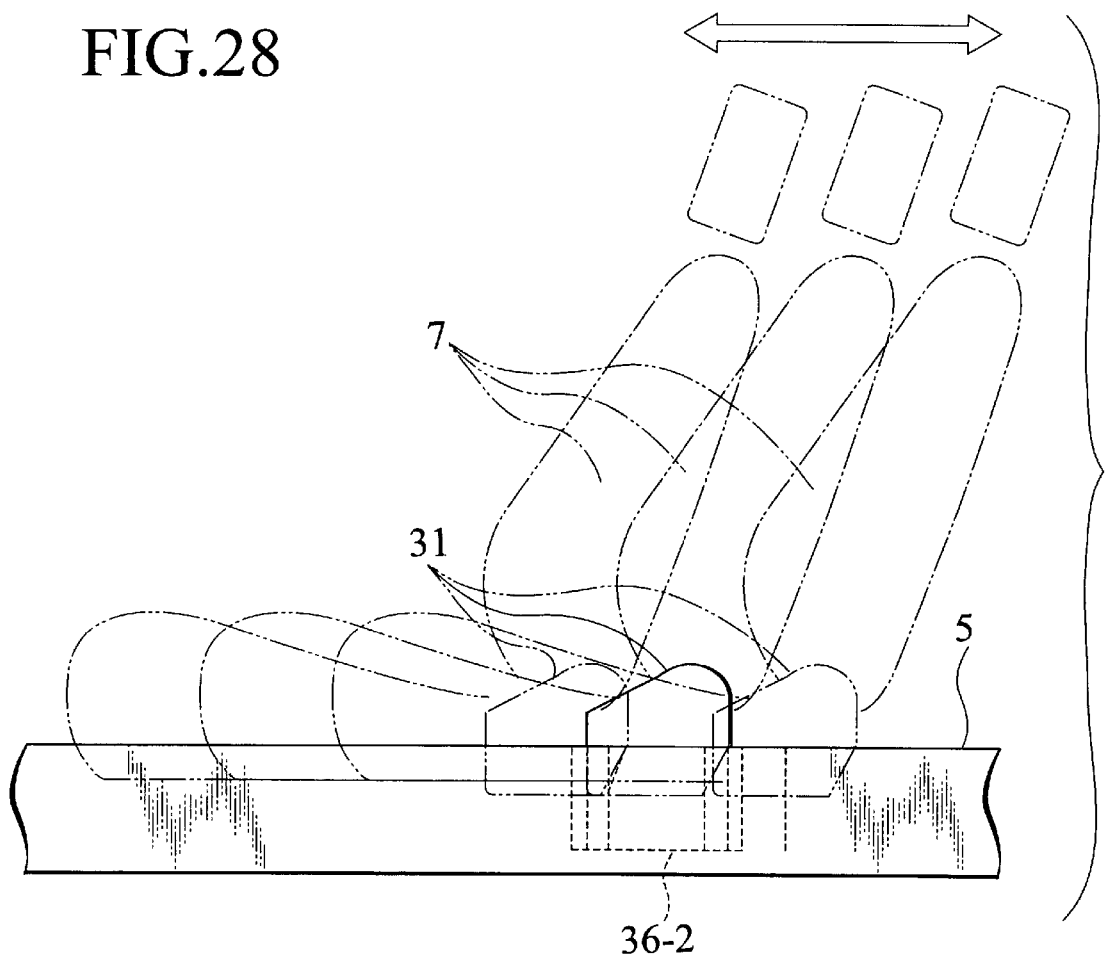
FIG. 28 is a side view showing the vicinity of the in-tunnel reinforcement member of the twelfth embodiment.

FIGS. 27 and 28 show the twelfth embodiment of the present invention. Since not-shown other elements of this embodiment are similar to those of the other embodiments respectively, the descriptions of the overlapping elements are eliminated. According to the embodiment, an in-tunnel reinforcement member 36-2 is provided with plural (two in the shown example) hat-shaped sections projecting downward and separating from each other in the vehicle's width direction. As shown in FIG. 28, the in-tunnel reinforcement member 36-2 is positioned so that the front hat-shaped section opposes the center of reclining motion in case of the passenger's seat being in the front position and the rear hat-shaped section opposes the center of reclining motion in case of the passenger's seat being in the rear position. Accordingly, not only does the vehicle body structure of the embodiment operate similarly to that of the first embodiment, but also the structure is capable of stable energy absorption irrespective of the position of the passenger's seat. Note that, in view of the reduction of manufacturing cost, the in-tunnel reinforcement member 36-2 may be provided by pressing an existing member to be disposed inside the floor tunnel 5, for example, a "parking-brake" reinforce member.

[13th. Embodiment]

Figure 29:
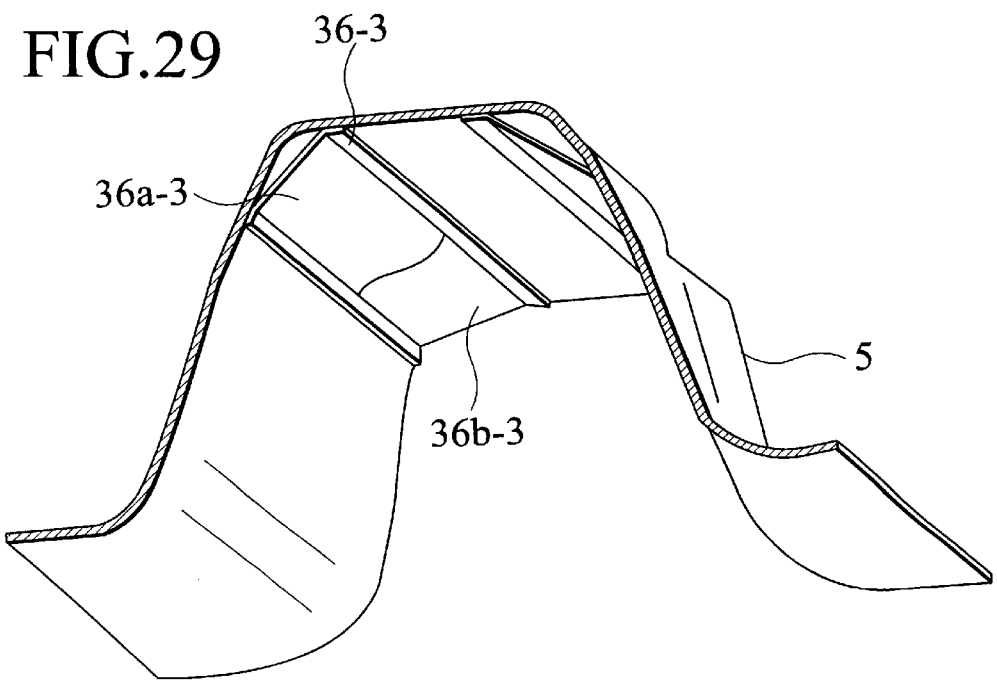
FIG. 29 is a perspective view of the in-tunnel reinforcement member of the thirteenth embodiment.
Figure 30:
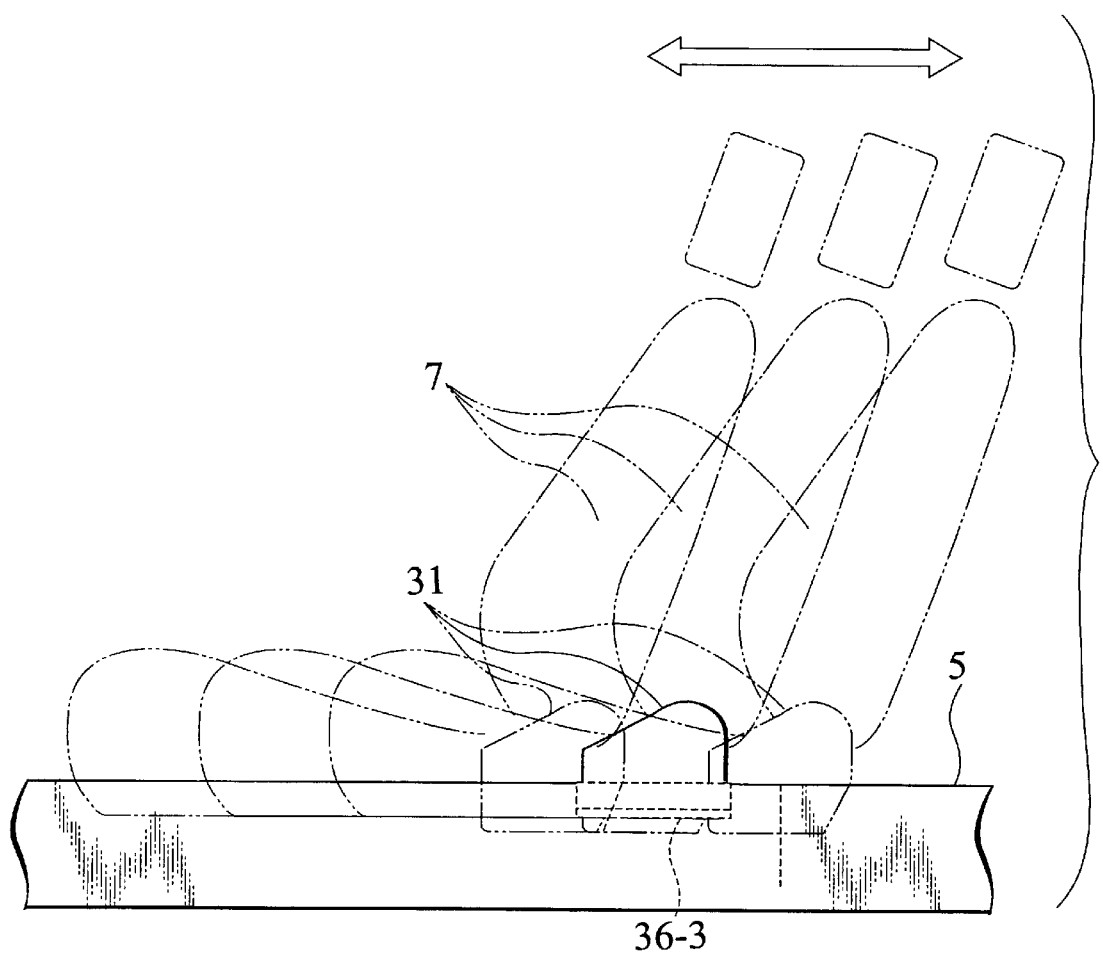
FIG. 30 is a side view showing the vicinity of the in-tunnel reinforcement member of the thirteenth embodiment.

FIGS. 29 and 30 show the thirteenth embodiment of the present invention. Since not-shown other elements of this embodiment are similar to those of the other embodiments respectively, the descriptions of the overlapping elements are eliminated. According to the embodiment, the floor tunnel 5 is provided, in the vicinity of the ridgelines, with a pair of in- tunnel reinforcement members 36-3 in place of the in-tunnel reinforcement member 36-2 of the previous embodiment. Each in-tunnel reinforcement member 36-3 has a flat plate 36a-3 defining a closed section together with the floor tunnel 5 and a foaming resin 36b-3 filled in the closed section. Similarly to the previous embodiment, each in-tunnel reinforcement member 36-3 is also positioned so that its front end opposes the center of reclining motion in case of the passenger's seat being in the front position and the rear end opposes the center of reclining motion in case of the passenger's seat being in the rear position. Consequently, not only does the vehicle body structure of the embodiment operate similarly to that of the first embodiment, but also respective ridge portions of the floor tunnel 5 can be reinforced over the whole range of slide movement of the passenger's seat. Furthermore, since the in-tunnel reinforcement member 36-3 serve to also reinforce the floor tunnel 5 in the vehicle's width direction, it is possible to progress the energy absorption furthermore.

[14th. Embodiment]

Figure 31:
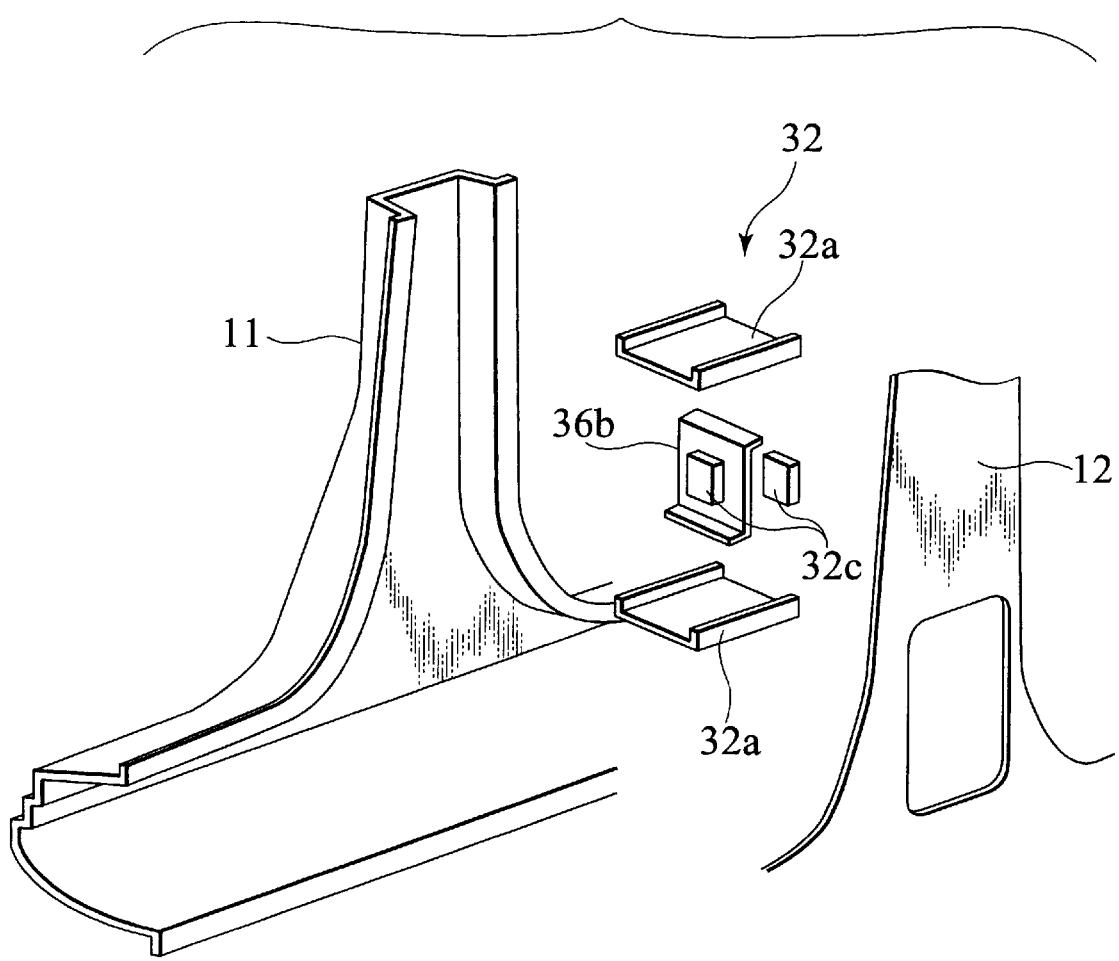
FIG. 31 is an exploded perspective view of the in-pillar reinforcement member of the fourteenth embodiment.

FIG. 31 shows the fourteenth embodiment of the present invention. Since not-shown other elements of this embodiment are similar to those of the other embodiments respectively, the descriptions of the overlapping elements are eliminated. According to the embodiment, a pair of resin plates 32c, 32c are glued onto front and rear faces of the rib 32b of the pillar reinforcement member 32. In manufacturing the vehicle body structure of the embodiment, these resin plates 32c, 32c can foam on the drying line in the painting process, so that the space between the upper and lower bulkheads 32a, 32a is filled with the foaming resin. Consequently, not only does the vehicle body structure of the embodiment operate similarly to that of the first embodiment, but also the structure can enhance an efficiency in transmitting the impact load because of its lightweight.

[15th. Embodiment]

Figure 32:
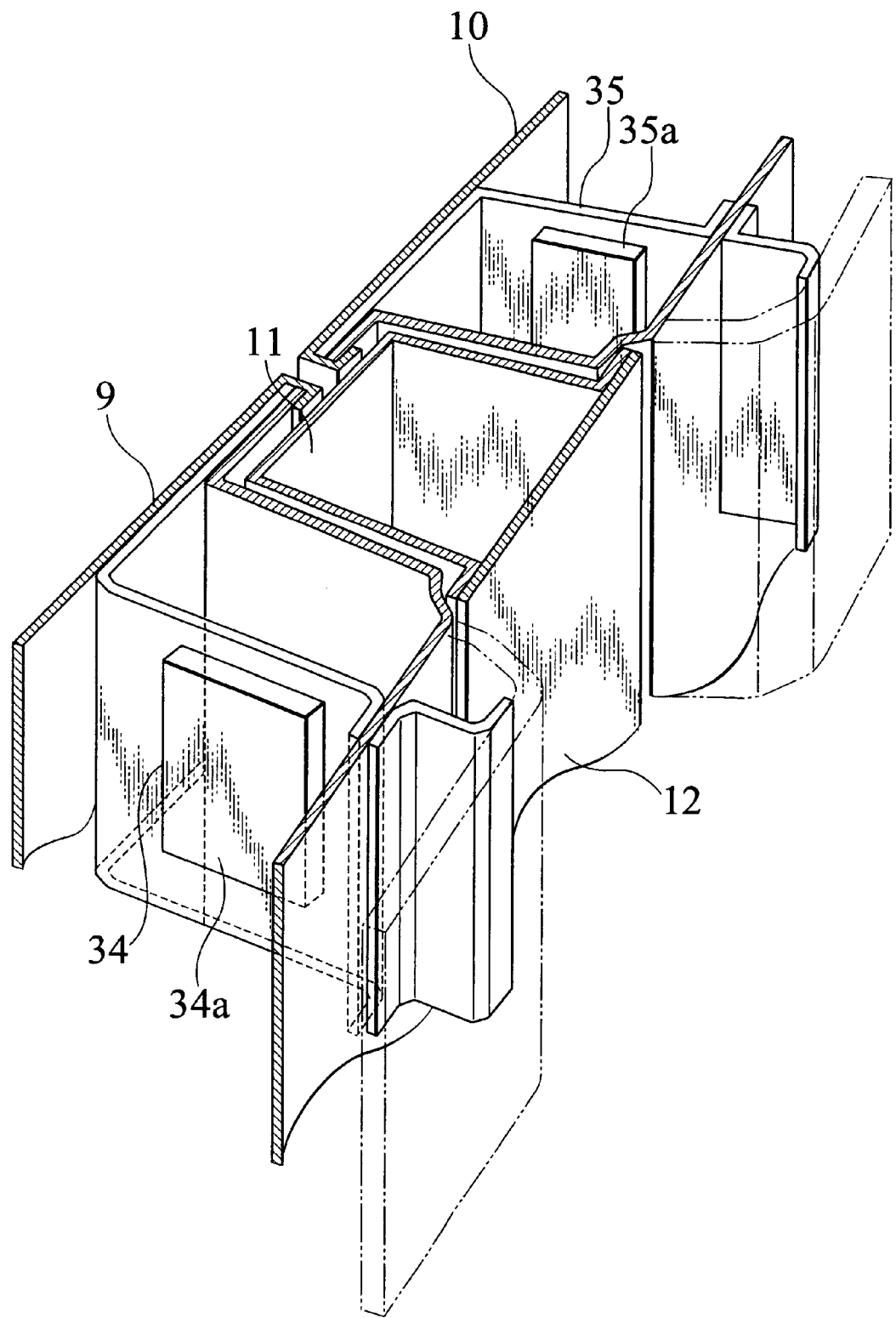
FIG. 32 is a sectional perspective view of the door reinforcement members of the fifteenth embodiment.

FIG. 32 shows the fifteenth embodiment of the present invention. Since not-shown other elements of this embodiment are similar to those of the other embodiments respectively, the descriptions of the overlapping elements are eliminated. According to the embodiment, there are provided a pair of resin plates 34a, 35a inside the closed sections defined by the door reinforcement members 34, 35 and the doors 9, 10, respectively. The resin plates 34a, 35a are glued onto the door reinforcement members 34, 35, respectively. Similarly to the previous embodiment, these resin plates 34a, 35a can foam on the drying line in the painting process, so that the closed sections are filled with the resultant foaming resin. Consequently, not only does the vehicle body structure of the embodiment operate similarly to that of the first embodiment, but also the structure can enhance an efficiency in transmitting the impact load because of its lightweight.

[16th. Embodiment]

Figure 33:
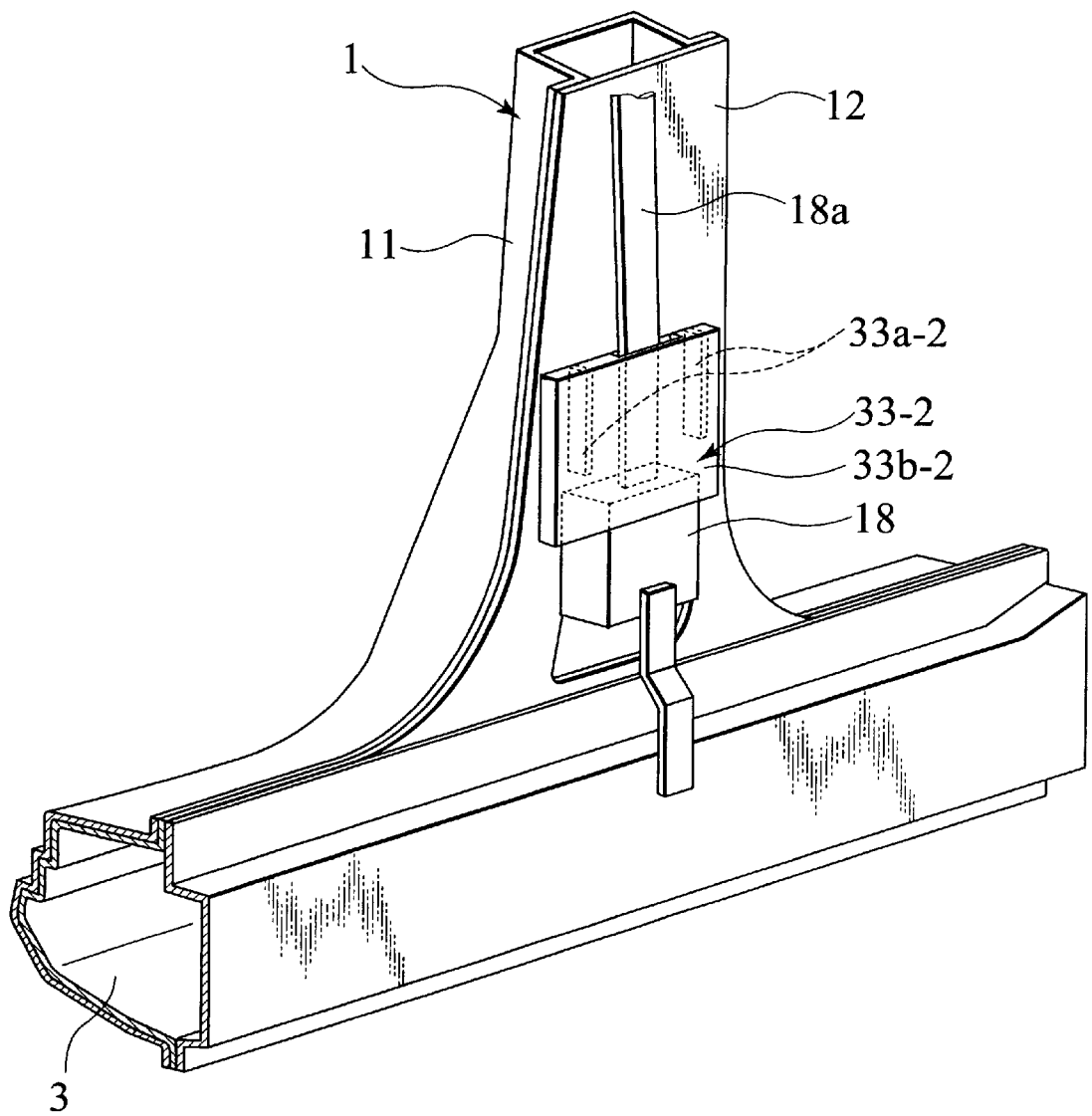
FIG. 33 is an exploded view of the in-garnish reinforcement member of the sixteenth embodiment.

FIG. 33 shows the sixteenth embodiment of the present invention. Since not-shown other elements of this embodiment are similar to those of the other embodiments respectively, the descriptions of the overlapping elements are eliminated. According to the embodiment, an in-garnish reinforcement 33-2 is provided in place of the in-garnish reinforcement 33 of FIG. 10. The in-garnish reinforcement 33-2 has a plurality of ribs 33a-2 serving as an upper supporting bracket for the seat belt winding unit 18 and a protection lid 33b-2. Consequently, not only does the vehicle body structure of the embodiment operate similarly to that of the first embodiment, but also the structure can reduce the number of components.

Although the side panel is represented by the doors 9, 10 in common with the above-mentioned embodiments, the present invention is also applicable to a side panel that does not open and close.

The entire contents of the Japanese Patent Application No. 11-291778 (filed on Oct. 14, 1999) is incorporated herein by reference.

The scope of the invention is defined with reference to the following claims.

What is claimed is:

1. A vehicle body structure, comprising:
   a center pillar arranged on a lateral side of a passenger's room to extend up and down, the passenger's room being defined by the vehicle body;
   side panels positioned in front and behind the center pillar, respectively;
   a floor panel arranged at the bottom of the passenger's room;
   a floor tunnel formed to project upward at the center of the floor panel of the vehicle's width direction and also extend in the fore-and-aft direction of the vehicle body;
   a passenger's seat arranged on the floor panel, between the floor tunnel and the side panel;
   a load-direction converting member has an input part to receive a side impact load and an output part to transmit the side impact load to the floor tunnel, the input part being arranged higher than the output part;
   the passenger's seat has a seat back and a seat cushion;
   wherein the load-direction converting member depends at least partially below the seat back.

2. The vehicle body structure of claim 1, wherein
   the seat back has a seat back frame accommodated therein, the seat back frame having an upper frame and a lower frame; and
   the load-direction converting member is formed in one body with the lower frame.

3. The vehicle body structure of claim 2, wherein
   the load-direction converting member has an inclined part extending from the lower frame toward the floor tunnel, downward obliquely.

4. The vehicle body structure of claim 1, further comprising:
   a pillar garnish arranged inside the center pillar in the vehicle's width direction; and
   a in-garnish reinforcement member arranged in a position between the pillar garnish and the center pillar being capable of opposing the load-direction converting member or an outer end of the load transmitting member of the vehicle's width direction, the in-garnish reinforcement member being operative to reinforce the pillar garnish in the vehicle's width direction.

5. The vehicle body structure of claim 3, wherein
   the load-direction converting member is formed so as to extend substantially straight between an inner end of the load-direction converting member on the side of the vehicle body's center of the vehicle's width direction and an outer end of the load-direction converting member on the outside of the vehicle.

6. The vehicle body structure of claim 1, wherein
   the load-direction converting member is arranged so as to extend in the vehicle's width direction and also arranged in a manner that an inner end of the load-direction converting member on the side of the vehicle body's center of the vehicle's width direction is in the vicinity of the center axis of a reclining rotation of the passenger's seat.

7. The vehicle body structure of claim 1, wherein
   the seat back frame is provided, on its outer side face of the vehicle's width direction, with a load transmitting member projecting outside in the vehicle's width direction.

8. The vehicle body structure of claim 7, wherein
   the load transmitting member is connected with the seat back's part that opposes the outer end of the load-direction converting member in the vehicle's width direction.

9. The vehicle body structure of claim 4, wherein the in-garnish reinforcement member is formed in one body with a cover for a seat belt winding device to be attached to the center pillar.

10. The vehicle body structure of claim 1, further comprising:
    a reclining device arranged beside the passenger's seat, on the side of the floor tunnel; and
    a reclining-device reinforcement member positioned on the side of the reclining device close to the floor tunnel, the reclining-device reinforcement member being operative to reinforce the reclining device in the vehicle's width direction; wherein
    the reclining-device reinforcement member is arranged to overlap with the floor tunnel in an upward-and-downward direction of the vehicle.

11. The vehicle body structure of claim 1, further comprising:
    an in-tunnel reinforcement member arranged in a position inside the floor tunnel being capable of opposing an inner end of the load-direction converting member on the side of the vehicle's center of the vehicle's width direction, the in-tunnel reinforcement member being operative to reinforce the floor tunnel in the vehicle's width direction.

12. The vehicle body structure of claim 11, wherein the in-tunnel reinforcement member has a foaming resin.

13. The vehicle body structure of claim 1, wherein the passenger's seat equipped with the load-direction converting member has a crushing strength in the vehicle's width direction, which is established larger than a crushing strength of the floor tunnel.

14. The vehicle body structure of claim 7, further comprising:

an in-pillar reinforcement member arranged in a position inside the center pillar being capable of opposing the load-direction converting member or an outer end of the load transmitting member of the vehicle's width direction, the in-pillar reinforcement member being operative to reinforce the center pillar in the vehicle's width direction.

15. The vehicle body structure of claim 14, wherein the in-pillar reinforcement member has a foaming resin.

16. The vehicle body structure of claim 1, further comprising:

a side panel reinforcement member arranged in a position inside the side panel being capable of opposing one of the load-direction converting member and an outer end of the load transmitting member of the vehicle's width direction, the side panel reinforcement member being operative to reinforce the side panel in the vehicle's width direction.

17. The vehicle body structure of claim 16, wherein the side panel reinforcement member has a foaming resin.

\* \* \* \* \*